United States Patent [19]

Watanabe

[11] Patent Number: 4,884,227

[45] Date of Patent: Nov. 28, 1989

[54] SPEED DETECTING APPARATUS FOR A VEHICLE

[75] Inventor: Masao Watanabe, Nagoya, Japan

[73] Assignee: Toyota Jidosha Kabushiki Kaisha, Tokyo, Japan

[21] Appl. No.: 132,066

[22] Filed: Dec. 11, 1987

[51] Int. Cl.$^4$ .................. G01P 11/00; G01P 15/00
[52] U.S. Cl. .................. 364/565; 364/426.01; 364/426.02; 324/161; 324/166
[58] Field of Search .......... 364/565, 569, 442, 426.01, 364/426.02; 123/414; 377/20, 38; 324/78, 161, 166; 303/95; 361/240

[56] References Cited

U.S. PATENT DOCUMENTS

| | | | |
|---|---|---|---|
| 4,072,364 | 2/1978 | Gudat et al. | 361/240 |
| 4,073,432 | 2/1978 | Schröder | 324/78 |
| 4,202,350 | 5/1980 | Walton | 324/78 |
| 4,584,528 | 4/1986 | Ohmae et al. | 377/20 |
| 4,667,297 | 5/1987 | Kawai | 364/565 |
| 4,670,852 | 6/1987 | Masaki et al. | 324/166 |
| 4,718,013 | 1/1988 | Kubo | 303/95 |
| 4,720,794 | 1/1988 | Skarvada | 303/95 |

Primary Examiner—Parshotam S. Lall
Assistant Examiner—V. Trans
Attorney, Agent, or Firm—Oliff & Berridge

[57] ABSTRACT

An apparatus for electrically detecting the speed of a vehicle or the rotating speed of a wheel which is especially suitable for accurate speed detection in an antiskid control circuit. This apparatus includes a rotor fixed on a rotating portion of the vehicle and provided with protruding timing teeth on the peripheral surface thereof at regular intervals and a sensor provided in the vicinity of the teeth of the rotor and not being in contact with the teeth of the rotor. The sensor detects the movement of the teeth with the rotation of the rotor electro-magnetically or by high frequency and outputs an electrical pulse signal as a speed detecting signal. In order to obtain accurate speed from the pulse signal, the center position of the pulse signal is obtained from both the output timing of the front or rear edge of the pulse and the pulse width, and the rotating speed of the rotor is calculated on the basis of the center position. Thus, accurate speed detection is accomplished without error being introduced from a low-frequency swell and high-frequency noise components of a detected signal.

6 Claims, 23 Drawing Sheets

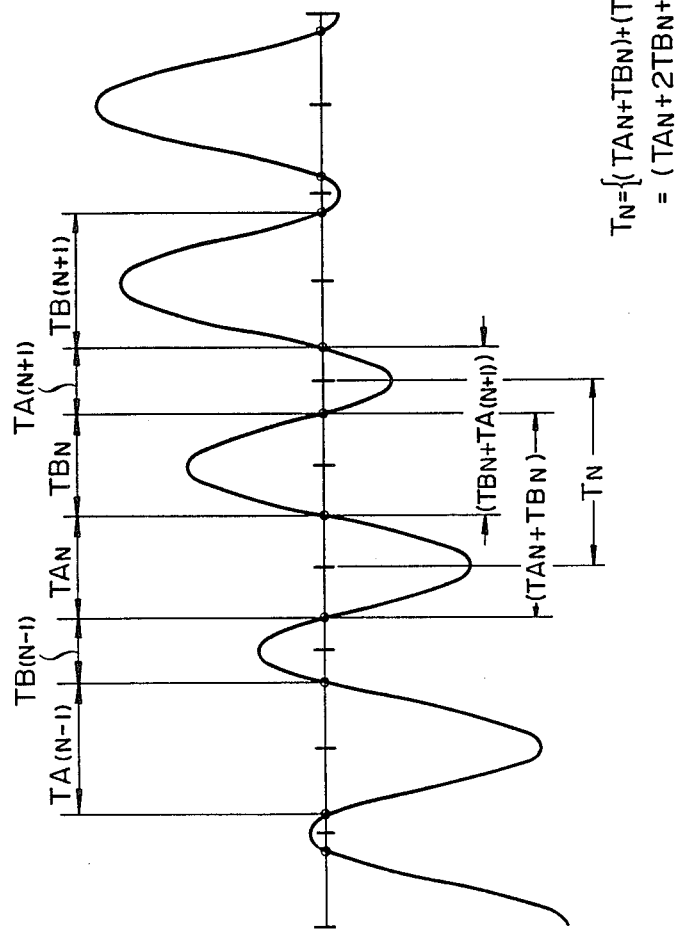

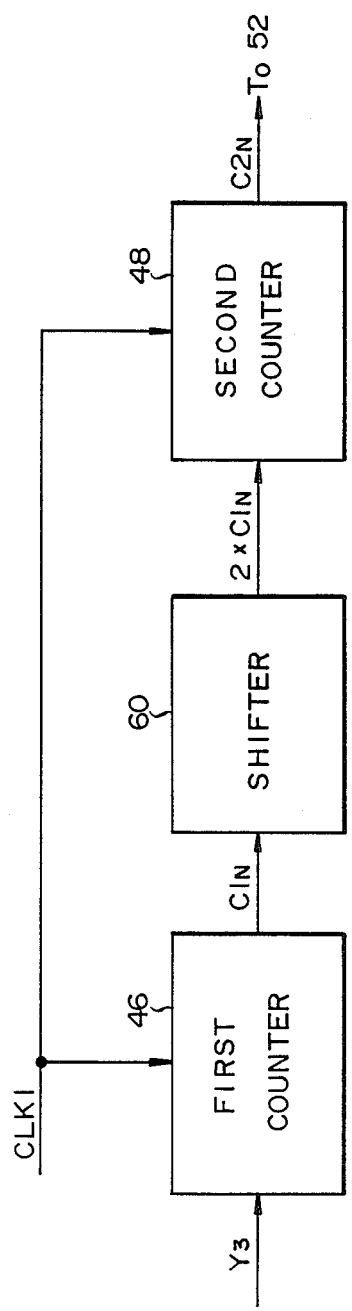

FIG. 16

| COMPARATIVE METHODS | | PROCESSING OF NEUTRAL POINT | ERROR FROM NORMAL | | RELATIVE ERROR BETWEEN ADJACENT WAVELENGTHS | | AVERAGE ERROR OF 8 WAVELENGTHS | | 
|---|---|---|---|---|---|---|---|---|
| | | | SWELL | NOISE | SWELL | NOISE | SWELL | NOISE |
| SINGLE-SIDE DETECTION (PRIOR ART) | | ZERO-CROSS METHOD | 17.3 | 0 | 5.3 | 0 | 3.9 | 0 |
| BOTH-SIDE DETECTION | 3-HALF WAVELENGTH, ½ FILTER | (FIG.15) ZERO-CROSS METHOD | 1.3 | 0 | 0.52 | 0 | 0.35 | 0 |
| | (INVENTION) | (FIG.17) AMPLITUDE SWELL CORRECTION METHOD | 0.3 | 0.06 | 0.15 | 0.02 | 0.12 | 0.02 |

[%]

SPEED DETECTING APPARATUS FOR A VEHICLE

BACKGROUND OF THE INVENTION

1. Field of the Invention

The present invention relates to a speed detecting apparatus for vehicles and, more particularly, to a speed detecting apparatus which is capable of detecting speed and/or acceleration with high accuracy.

2. Description of the Prior Art

Speed V and acceleration $\alpha$ are very important factors for a vehicle in objectively grasping the situation in which the vehicle is traveling. The speed detecting apparatus of a vehicle is therefore required to detect the speed and the acceleration with accuracy.

Especially, in present-day highly-electronized vehicles, the data on the detected speed V and acceleration $\alpha$ are widely used for various purposes, for example, for controlling automatic door locks, a power steering, a digital speed controller, the ignition time of the engine, a navigation controller and so forth. Accurate detection of these data is therefore very important for improving the drivability and comfortableness in the vehicle compartment.

In particular, in a vehicle equipped with an electronic skid control system (a system for preventing the vehicle from skidding due to the lock of the wheels at the time of a sudden application of the brakes), the rotating speed and the acceleration of each of the four wheels in total, namely, front and rear, right and left wheels, are detected separately from those of the other wheels by using a speed detecting apparatus. The detected speed and acceleration and a minute change therein are compared with the ideal travelling conditions stored in a computer in order to control the braking force of each wheel. Accordingly, very high-accuracy real time measurement of the wheel rotating speed and the acceleration is required.

A conventional speed detecting apparatus, however, cannot always detect speed and acceleration in a wide range from a low speed to high speed (e.g., 2.5 km/h to 250 km/h) with such high accuracy as is required by the electronic skid control system (hereinunder referred to as "ESC system").

The reason thereof will be described in detail hereinunder.

DETECTION OF SPEED

FIG. 18 shows a preferred example of a speed detecting apparatus used in an ESC system. A rotor 10 is provided on the rotary side, namely, on the side of a wheel, a transmission, etc., and a sensor 12 is provided on the stationary side in such a manner as to face the rotor 10.

The rotor 10 and the sensor 12 may be so constituted as to detect the rotation of the rotor 10 either electromagnetically or optically.

In the apparatus shown in FIG. 18, the rotor 10 is formed as a timing gear consisting of a magnetic material and a multiplicity of timing teeth 10A are protrudingly provided on the outer surface of the timing gear at regular intervals.

The sensor 12 is composed of a permanent magnet, a coil and the like, and detects the rotation of the timing gear 10 as a change in the magnetic resistance.

Accordingly, when the wheel and, hence, the timing gear 10 rotates, an AC signal $Y_1$ is output from the magnetic sensor 12 to a pulse generation circuit 14 every time each timing tooth 10A passes through the effective field of the magnetic sensor 12.

The pulse generation circuit 14 converts the input AC signal $Y_1$ to a speed detection pulse signal P which corresponds to the speed at which the timing tooth 10A passes, and outputs the pulse signal P to a speed calculation circuit 16.

Such a pulse signal P is proportional to the rotational frequency of the timing gear 10, and with the increase in the rotating speed the interval T at which the pulse signal P is output is shortened, while with the reduction in the rotating speed the interval T at which the pulse signal P is output is prolonged.

The speed calculation circuit 16 calculates and outputs the speed V and the acceleration $\alpha$ on the basis of the interval T at which the pulse signal P is output.

In such an apparatus for detecting the speed V and the acceleration $\alpha$ on the basis of the interval T at which the pulse signal P is output, it is necessary to output the pulse signal P from the pulse generation circuit 14 at an accurate phase (timing) in accordance with the timing at which the timing gear 10A passes through the field of the sensor 12.

The conventional, generally used pulse generation circuit 14, however, employs a zero-cross method shown in FIG. 19, in which the pulse signal P is output at the point where the AC signal $Y_1$ crosses the zero volt level in the section where the AC signal $Y_1$ changes from the upper peak value to the lower peak value.

This speed detecting apparatus therefore enables accurate detection of the speed V and the acceleration $\alpha$ if the sensor 12 only outputs as the AC signal $Y_1$, the fundamental wave which corresponds to the timing at which each timing tooth passes through the field of the sensor 12, as the AC signal $Y_1$, in other words, if it is possible to eliminate the DC component from the detected signal, thereby outputting the pulse signal P at an accurate phase.

REASON OF ERROR

Actually, however, since a swell component of a low frequency and a noise component of a high frequency are mixed into the AC signal $Y_1$ output from the magnetic sensor 12 due to the following reasons, a comparatively large error is inconveniently contained in the detected speed and acceleration. (a) Generation of swell When a rotor 10 is used as the timing gear, the timing gear, which is produced by pressing, has a low rigidity, and when such a timing gear is mounted on a wheel, a fixing strain is generated on both the base side and the timing gear.

In addition to the fixing strain, a strain is generated by the cornering force in the vehicle traveling and the like.

As a result, in the course of one revolution of the rotor 10, the distance C between each timing tooth 10A provided on the outer surface of the rotor 10 and the magnetic sensor 12 varies in correspondence with the strain. A swell W of a low frequency is therefore contained in the output $Y_1$ of the magnetic sensor 12, as shown in FIG. 19, so that phase errors $\epsilon_1$, $\epsilon_2$, ... are contained in the pulse signal P according to the conventional zero-cross method.

Consequently, even if the speed V and the acceleration $\alpha$ are constant, when the swell W rises, the interval at which the pulse signal P is output is prolonged, while when the swell W falls, the interval is shortened, as shown in FIG. 19, so that the error component corresponding to the swell W is contained in the detected results of the speed V and the acceleration α. (b) Generation of noise When such a speed detecting apparatus is used in the ESC system, a noise component N having a higher frequency than the fundamental wave is contained in the AC signal $Y_1$, as shown in FIG. 20, due to the braking chatter or by other influence.

As a result, even if the speed V and the acceleration α are constant, phase errors $\epsilon_1$, $\epsilon_2$, ... are generated in the pulse signal P, as shown in FIG. 20, and a certain error component is contained in the detected speed V and acceleration α.

The error caused by the noise component N is increased accordingly as the amplitude of the fundamental wave in the AC signal $Y_1$ becomes smaller.

Therefore, if a large swell component W is contained in the AC signal $Y_1$ in addition to the noise component N and the height of the total wave form is reduced due to the swell, the contact angle $\theta$ with the 0 level is made smaller, and the phase error $\epsilon$ on the pulse signal P increases in proportion to $\sin\theta$, as shown in FIG. 21.

(C) As described above, the AC signal $Y_1$ output from the sensor 12 often contains the swell component W of a low frequency and the noise component N of a high frequency as well as the fundamental wave corresponding to each tooth of the timing gear 10.

As a result, the timing at which the pulse signal P is output deviates from the timing at which the corresponding timing tooth 10A passes by the sensor 12, so that a comparatively large error is disadvantageously contained in the detected speed V and acceleration α.

In order to suppress the generation of such an error in measurement, various improvements have conventionally been taken in both hardwares and softwares.

IMPROVEMENT IN HARDWARD (a) FIG. 23 shows a speed detecting apparatus disclosed in Japanese Patent Laid-Open No. 83647/1980. The speed detecting apparatus is provided with a low pass filter 18 between the output side of the sensor 12 and a controlling amplifier 20. The low pass filter 18 controls the cut-off frequency in accordance with the control signal output from the control amplifier 20 to eliminate a component having a high frequency than the fundamental wave.

Thus, the apparatus can eliminate the noise component N having a high frequency such as that shown in FIG. 20 from the AC output $Y_1$. However, since the apparatus cannot eliminate the swell component W of a low frequency contained in the AC output $Y_1$, it is not always possible to detect the accurate speed V and acceleration α.

(b) It may be considered that a high pass filter provided on the output side of the sensor 12 would remove the swell component. It is impossible, however, to eliminate the swell component at a vehicle speed over the cross-over frequency of the high pass filter, while at a speed below the cross-over frequency, the fundamental wave itself is attenuated by 6dB at the same time with the removal of the swell. In this system which covers a broad range of vehicle speed (2.5 km/h to 250 km/h), it is necessary to change the cross-over frequency in correspondence with the current vehicle speed and, in addition, it is very difficult to provide a high pass filter for the sensor the output of which has an amplitude proportional to the vehicle speed.

Thus, no vehicle speed detecting apparatus has been developed yet that is capable of measuring the speed and the acceleration with accuracy without being influenced by the swell component W of a low frequency and the noise component N of a high frequency by using such a filter.

IMPROVEMENT IN SOFTWARE

FIGS. 24 to 27 show a proposal disclosed in Japanese Patent Laid-Open No. 158564/1982. The proposal relates to an acceleration detecting apparatus for obtaining the acceleration α by computing a pulse signal in accordance with a predetermined program.

In the acceleration detecting apparatus, the interval at which the acceleration is detected is sequentially varied from n = 1, to 2, 4, 8, ... (corresponding to the mode 1, 2, 3, 4... in FIG. 25) in terms of the number of intervals between the timing teeth 10A of the timing gear 10 in order to compensate for the deviation ΔT of period of the detected pulse signal P (caused chiefly by a low mechanical accuracy) output from the vehicle speed detecting apparatus, and the difference in period between the adjacent sections is obtained.

When the difference in period is not less than the reference value S, the acceleration α is obtained on the basis of the following formula:

$$\alpha = (1/T_{n+1} - 1/T_n)/[(T_{n+1} + T_n)/2]$$

When the difference in period is less than S, the acceleration is taken as $\alpha^\sim = 0$.

Although this conventional apparatus can compensate for the low mechanical accuracy with respect to the deviation ΔT of a period which is smaller than S, it cannot compensate for the effect on the deviation ΔT of a period which is larger than S.

In a typical timing gear 10 which has about 100 teeth and is secured by 5 to 6 bolts, for example, the period of the swell W generated is equivalent to the period in which 16 to 10 timing teeth 10A pass by the sensor 12, the period being much larger than the deviation S of period of the pulse signal P.

The conventional apparatus is therefore disadvantageous in that when the period of the swell component W is close to a multiple of the period n, it is almost impossible to calculate the acceleration without being influenced by the swell component W.

SUMMARY OF THE INVENTION

Accordingly, it is an object of the present invention to eliminate the above-described problems in the prior art and to provide a speed detecting apparatus which is capable of measuring the speed and/or the acceleration accurately at a real time without being influenced by the swell component, noise component and so forth which are contained in the AC signal output from the sensor.

To achieve this aim, a speed detecting apparatus of the present invention comprises:

a rectangular wave generation circuit for converting an AC signal into a rectangular pulse and outputting the generated rectangular pulse signal which represents the rise point or the fall point of a rectangular pulse;

a rectangular pulse counter for counting the rectangular wave generation signals and outputting the count value as a pulse number count signal which indicates the number of the output rectangular pulses;

a time counter for cumulatively counting clock pulses and outputting the cumulative count value as a time count signal which indicates the time at the rise point or the fall point of a rectangular pulse every time the rectangular pulse rises or falls;

a time calculator for calculating the time for outputting the center position of a peak side rectangular pulse or a trough side rectangular pulse on the basis of the time count signal and outputting the calculated value as a center position outputting time signal, a memory circuit for storing the pulse number count signal and the center position outputting time signal corresponding to the pulse number count signal on the basis of a read signal; and a speed calculation unit for calculating the average value of two pulse trains which overlap each other by the half period and are equivalent to one period of the AC signal every time new signal data are written and stored in the memory circuit by using the new signal data and the preceding written data, and for computing the speed and/or the acceleration from the average value and the pulse number count signal. The speed detecting apparatus is characterized in that it can detect the speed and/or the acceleration without being influenced by the swell component of a low frequency and the noise component of a high frequency which are contained in the AC signal.

The above and other objects, features and advantages of the present invention will become clear from the following description of the preferred embodiments thereof, taken in conjunction with the accompanying drawings

BRIEF DESCRIPTION OF THE DRAWINGS

FIGS. 3 to 7 are explanatory views of the computing operations executed by using the embodiment shown in FIGS. 1 and 2;

FIGS. 8 and 9 are explanatory views of a second embodiment of the present invention;

FIG. 15 to 17 are explanatory views of the experimental data on the present invention;

DESCRIPTION OF THE PREFERRED EMBODIMENTS

ESC System

Figure 1:
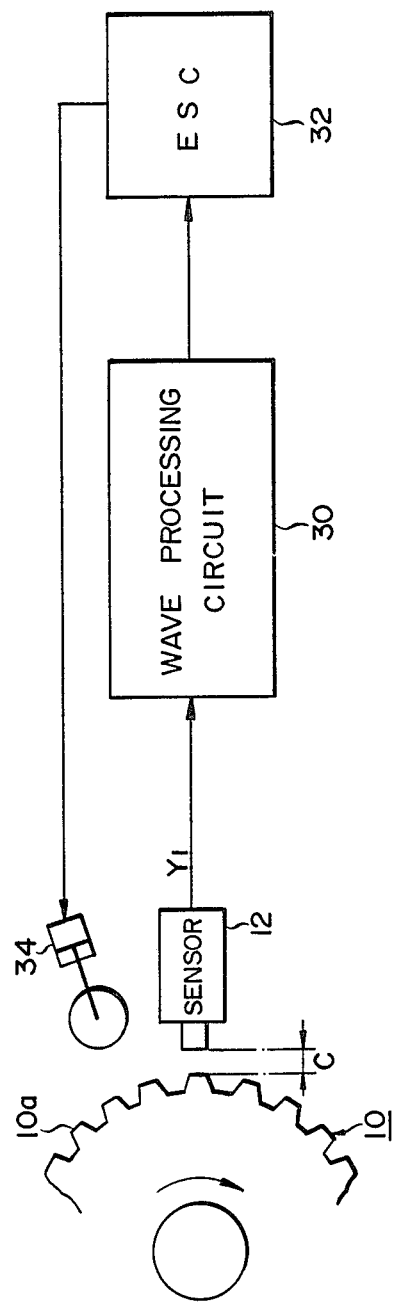
FIGS. 1 and 2 are block diagrams showing a first embodiment of a speed detecting apparatus according to the present invention.
Figure 18:
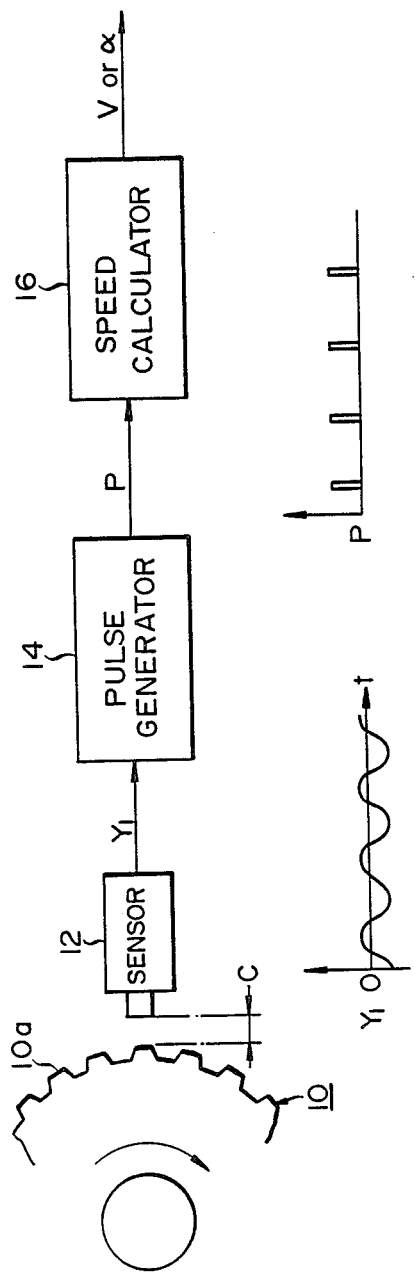
FIG. 18 is a block diagram of a conventional detecting apparatus
Figure 19:
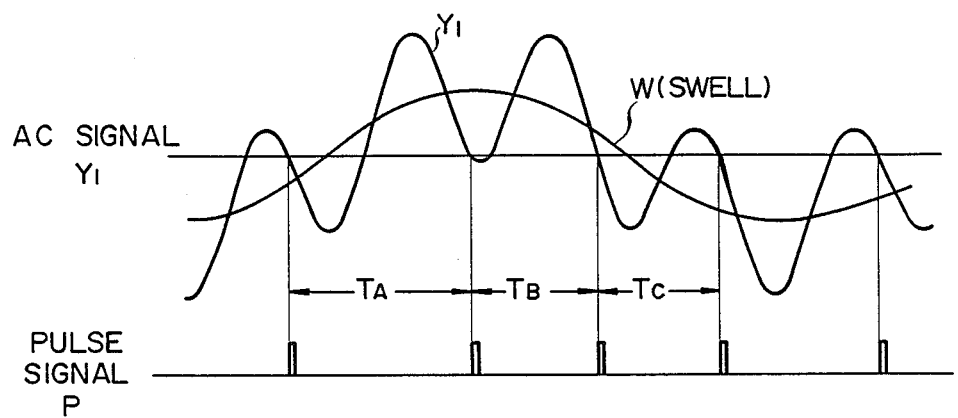
FIGS. 19 to 22 are explanatory views of the wave containing a swell component of a low frequency or a noise component of a high frequency.
Figure 20:
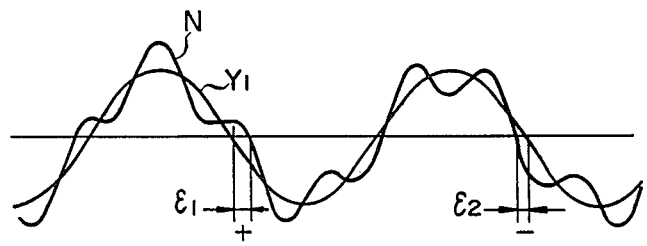

FIG. 1 shows an embodiment of a speed detecting apparatus according to the present invention which is applied to the ESC system. The same numerals are provided for the elements corresponding to those in FIG. 18, and therefore the explanation designated by those reference numerals will be omitted.

In the speed detecting apparatus of this embodiment, the AC signal $Y_1$ detected by the sensor 12 is input to a wave processing circuit 30, which calculates the speed V and/or the acceleration $\alpha$ and outputs the result to an ESC 32.

The primary characteristic feature of the present invention lies in that accurate calculation of the speed V and the acceleration $\alpha$ is enabled without being influenced by the swell component W of a low frequency and the noise component N of a high frequency contained in the AC signal $Y_1$ of the sensor 12.

Therefore, when the speed V and the acceleration $\alpha$ inputs to the ESC 32 indicate that the deceleration of the corresponding wheel is more than a predetermined value, the ESC 32 accurately judges that the wheel has assumed a skid state, thereby controlling the corresponding brake cylinder 34 so as to take off the brakes. When the speed V is restored, the ESC 32 outputs a control command to the brake cylinder 34 so as to apply the brakes again.

According to the speed detecting apparatus of the present invention, since it is possible to detect the speed V and the acceleration $\alpha$ at a real time almost without being influenced by the swell component W of a low frequency and the noise component N of a high frequency unlike the conventional apparatus, and the detected data contain almost no error component, there is little possibility of the ESC 32 misjudging whether or not the corresponding wheel is in the skid state and it is possible to provide good control of the brakes for the corresponding wheel through the brake cylinder 34 even at the time of application of the sudden brakes.

The secondary characteristic feature of the present invention is that the time interval at which each timing tooth 10A passes through the field of the sensor 12 is calculated at high speed mainly by using a counter. This structure greatly relieves the load of the CPU which is used in the wave processing circuit 30, thereby making it possible, for example, to use a CPU 52 not only for the calculation of the speed V and the acceleration $\alpha$ but also for other processing or controlling operations. For example, it is possible to also use the same and one CPU 52 as the CPU constituting the ESC 32.

First Embodiment

Figure 2:
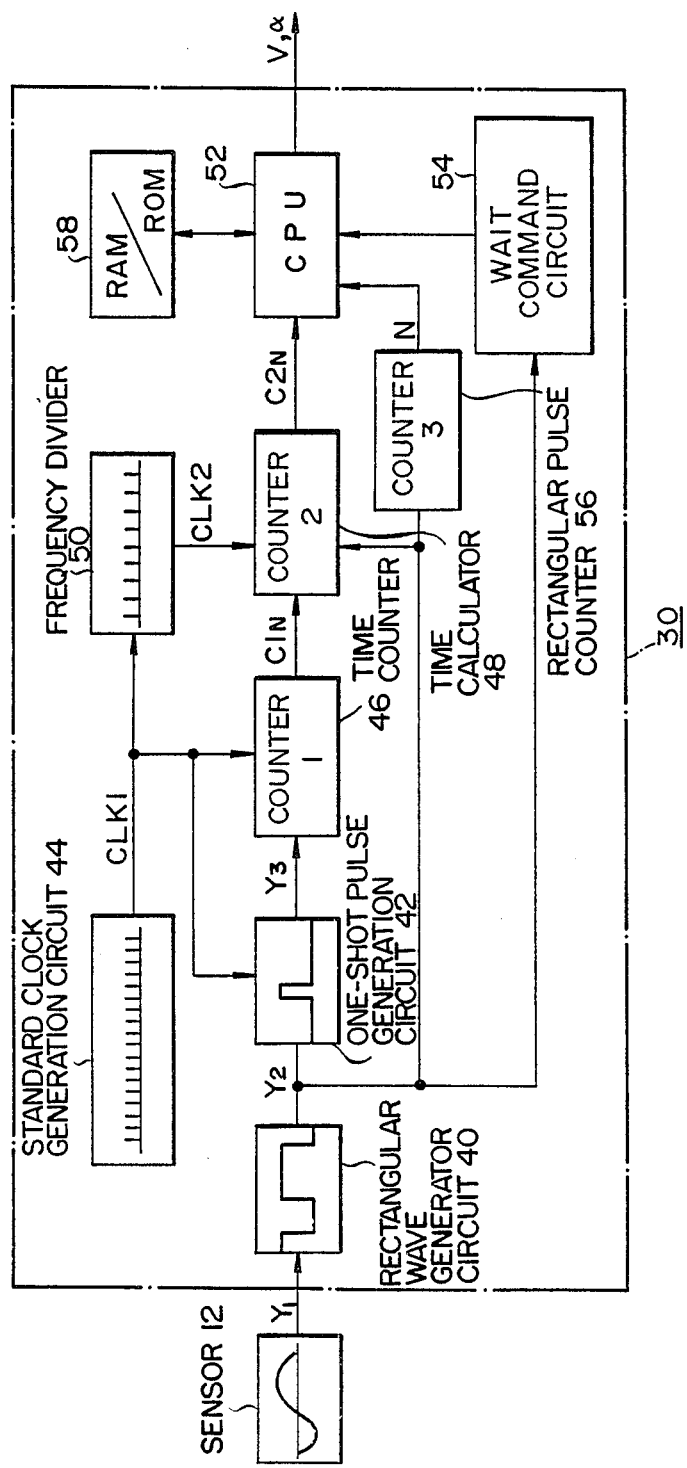
Figure 3:
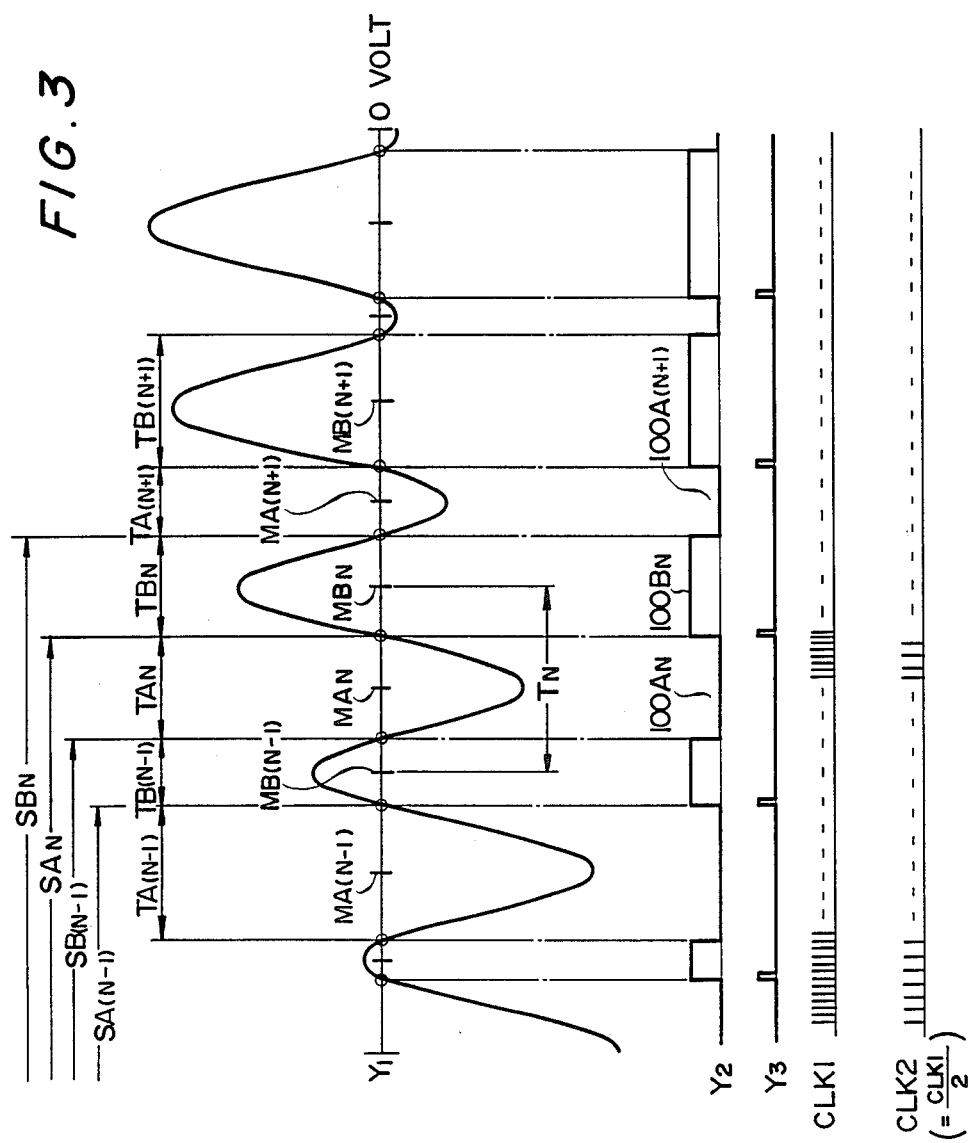
Figure 4:
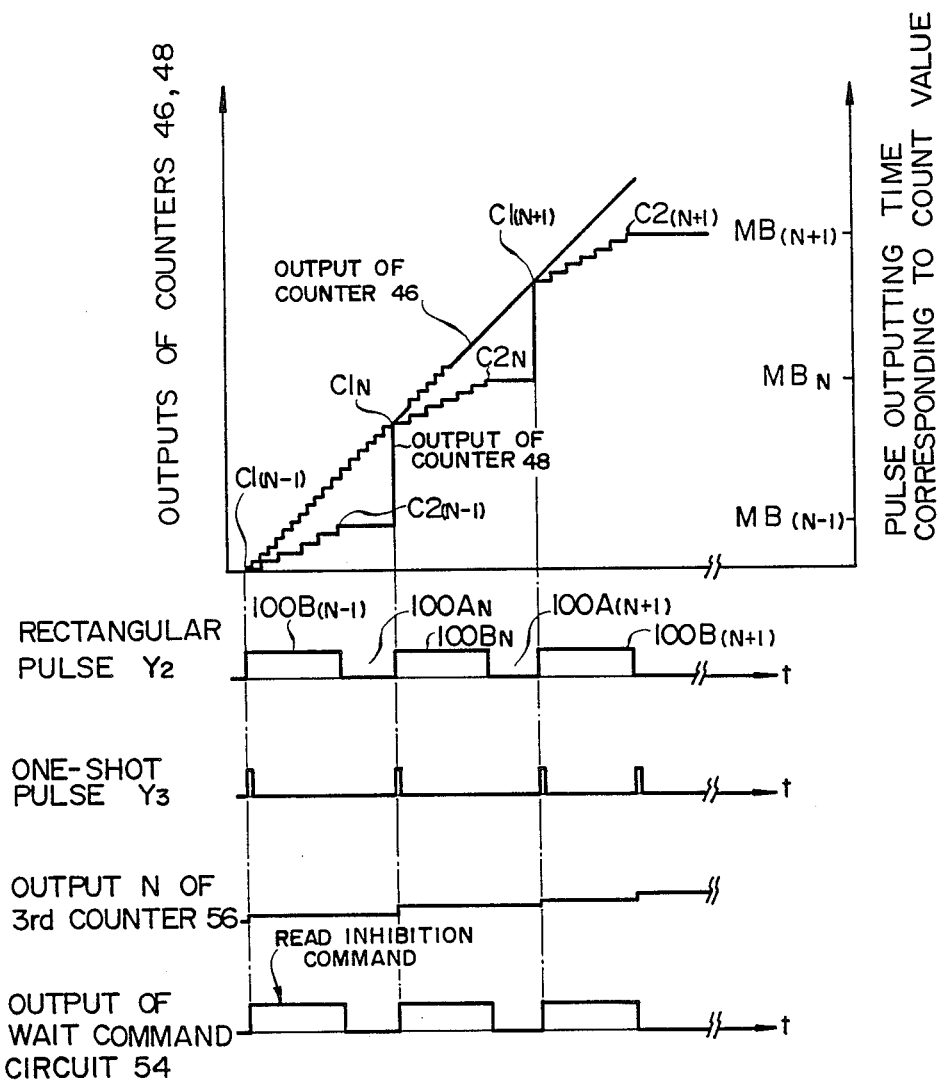

FIG. 2 shows the wave processing circuit 30 in a first embodiment of the present invention, and FIGS. 3 and 4 show wave forms at various portions of the circuitry thereof.

When the AC signal $Y_1$ such as that shown in FIG. 3 is input from the sensor 12 to a rectangular wave generation circuit 40, the rectangular wave generation circuit 40 converts the AC signal $Y_1$ to a rectangular pulse signal $Y_2$ with 0 V as the reference value.

In this embodiment, the rectangular wave generation circuit 40 is constituted by a Schmitt trigger circuit which uses the 0 level as the reference value. When the AC signal $Y_1$ is above 0 V, the rectangular pulse $Y_2$ is output as a peak side rectangular pulse 100B, and when the AC signal $Y_1$ is below 0 V, the rectangular pulse $Y_2$ is output as a trough side rectangular pulse 100A, as shown in FIG. 3.

Elimination of error component

The primary characteristic feature of the present invention is that the time interval at which each timing tooth 10A passes through the field of the sensor 12 is calculated without being influenced by the swell component having a low frequency and the noise component having a high frequency contained in the AC signal $Y_1$ by subjecting a train of the rectangular pulses $Y_2$ which are consecutively output in this way to a predetermined arithmetic processing.

For this purpose, in this embodiment, the time interval TN from the time when the (N−1)-th timing tooth 10A has passed by the sensor 12 to the time when the N-th timing tooth 10A passes in the same way is calculated in the following way.

As shown in FIG. 3, it is assumed in this embodiment that the point at which the N-th timing tooth 10A comes to the front of the sensor 12 is SAN and the point at which the N-th timing tooth 10A leaves the front of the sensor 12 is SBN. The point $MB_N$ at which the timing tooth 10A faces the sensor 12 at the directly opposite position is calculated as the average of the two points, as shown in the following formula:

$$MB_N = (SA_N + SB_N)/2 = SA_N + TB_N/2 \dots \quad (1A)$$

In the same way, the point $MB_{N-1}$ at which the (N−1)-th timing tooth, namely, the preceding timing tooth 10A has faced the front of the sensor 12 at the directly opposite position is obtained from the following formula:

$$MB_{N-1} = (SA_{N-1} + SB_{N-1})/2$$
$$= SA_{N-1} + TB_{N-1}/2 \dots \quad (1B)$$

Therefore, the time interval TN is obtained from the following formula:

$$\begin{aligned} TN &= MB_N - MB_{N-1} \quad &(1C)\\ &= (SA_N + SB_N)/2 - (SA_{N-1} + SB_{N-1})/2 \\ &= TB_{N-1}/2 + TA_N + TB_N/2 \\ &= (TB_{N-1} + 2 \cdot TA_N + TB_N)/2 \end{aligned}$$

Figure 5:
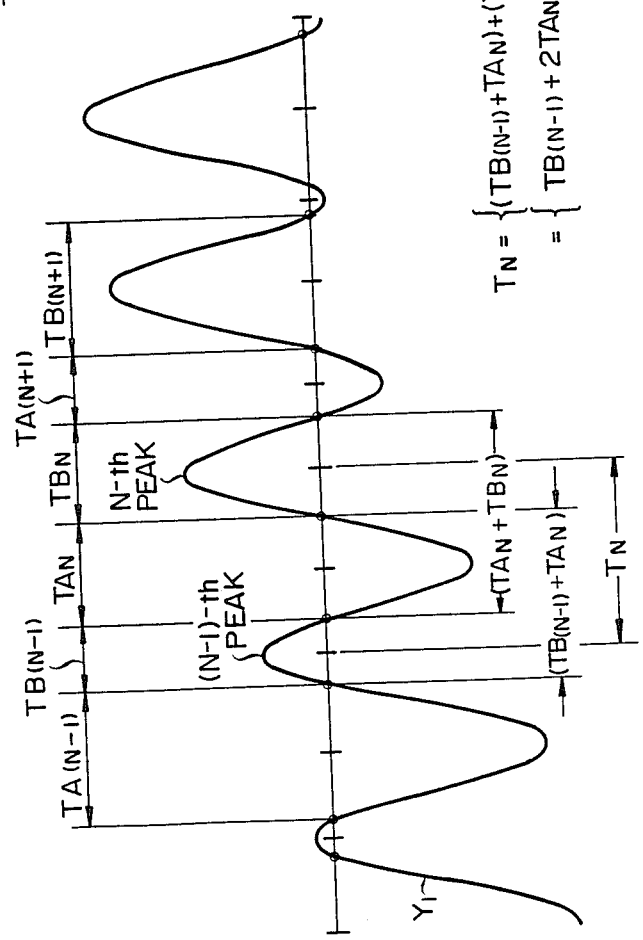

The concrete meaning of the formula (1C) is as follows:

As shown in FIG. 5, when the pulse time train of the (N−1)-th peak side rectangular pulse and the N-th trough side rectangular pulse is obtained, the value is represented as $(TB_{N-1} + TA_N)$.

In the same way, the pulse time train of the N-th trough side rectangular pulse and the N-th peak side rectangular pulse is represented as $(TA_N + TB_N)$.

Two pulse time trains obtained in this way overlap each other in the region of the N-th trough side rectangular pulse ($100A_N$). Consequently, by calculating the average value of the two pulse time trains on the basis of the formula (1C), it is possible to eliminate the influence of the swell component W and the noise component N contained in the AC signal $Y_1$ for the reasons (a) and (b) described in detail in the following.

(a) Reason why the swell component W is eliminated

Figure 6:
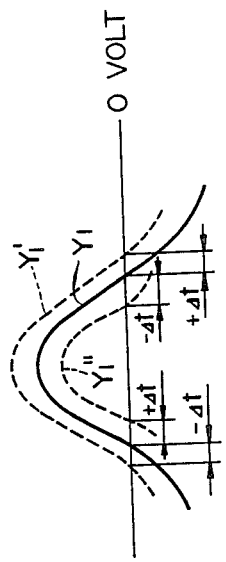

Supposing the original position $Y_1$ of the AC signal output from the sensor 12 is shifted upward to the position $Y_1'$, indicated by the broken line by the influence of the swell component W, as shown in FIG. 6, the timing at which the peak side rectangular pulse is output from the rectangular wave generation circuit 40 is advanced by $\Delta t$ while the timing at which the trough side rectangular pulse is output from the rectangular wave generation circuit 40 is delayed by $\Delta t$ with respect to the original time.

On the other hand, if the AC signal is shifted downward from the original position $Y_1$ to the position $Y_1''$ by the influence of the swell component W, the output of the peak side rectangular pulse is delayed by $\Delta t$, while the output of the trough side rectangular pulse is advanced by $\Delta t$ with respect to the original time.

In contrast, in the present invention, the position of the peak or the trough of the AC signal $Y_1$ is measured both at the rise and at the fall and the average value is obtained as the center position of the peak or the trough. Accordingly, it is possible to cancel the deviation of time $\Delta t$ and obtain the peak position $MB_N$ or the trough position $MA_N$ in the state of not being influenced by the swell component W unlike the case of processing the position on the basis of only one value measured at either the rise or the fall.

(b) Reason why the noise component N is eliminated

In the present invention, it is also possible to statistically reduce the influence of the noise component N of a high frequency contained in the AC signal $Y_1$.

When the peak side rectangular pulse 100B and the trough side rectangular pulse 100A are output on the basis of the AC signal $Y_1$, the timing for outputting them is influenced by the noise component N of a high frequency contained in the AC signal $Y_1$.

As explained in (a) and (b), according to the present invention, it is possible to effectively reduce the swell component W of a low frequency and the noise component N of a high frequency contained in the AC signal $Y_1$ and accurately obtain the time interval at which each timing tooth 10A passes through the field of the sensor 12 by measuring the positions $SA_N$ and $SB_N$ of both slopes with a peak or a trough of the AC signal therebetween, and obtaining the center $MB_N$ of the peak or the center $MA_N$ of the trough from the average of the positions $SA_N$ and $SB_N$ of the slopes.

It will therefore be understood that it is possible to calculate the speed V and the acceleration α at a real time with accuracy on the basis of the thus-obtained average value $T_N$ without being influenced by the swell component W of a low frequency and the noise component N of a high frequency.

Relief of the load of CPU

However, if the calculation based on the formula 1C is conducted through software, the CPU itself must always read $SA_N$ and $SB_N$ and repeat the calculation of $T_N$ on the basis of the formula 1C by using the read data at every period of the AC signal $Y_1$. As a result, the CPU spends most of its capacity on calculation of the speed V and the acceleration α and has little room left for other processing or controlling operations. The secondary characteristic feature of the present invention is that most of the calculations based on the formula 1C are carried out through a hardware mainly by using a counter, thereby (1) enabling high-speed calculation of the speed V and the acceleration α and (2) enabling the load of the CPU at the time of calculation to be greatly relieved and the remaining capacity to be allotted to other calculations or controlling operations.

To this end, in the apparatus of the present invention, the output $Y_2$ of the rectangular wave generation circuit 40 is input to a one-shot pulse generation circuit 42, as shown in FIG. 2.

The one-shot pulse generation circuit 42 outputs one shot of strip-shaped pulse signal $Y_3$ to a first counter 46 synchronously with a standard clock CLK1 which is output from a standard clock generation circuit 44 when the peak side rectangular pulse 100B is output from the rectangular wave generation circuit 40, as shown in FIG. 3.

The first counter 46 is a time counter for cumulatively counting the standard clock CLK1 output from the standard clock generation circuit 44, as shown in FIG. 4, and every time the strip-shaped pulse signal Y3 is output, the cumulative count value $C1_N$ is output to a second counter 48. Therefore, the cumulative count value $C1_N$ functions as a time count signal which indicates the time of the rise point of the rectangular pulse $Y_2$.

The second counter 48 in this embodiment is a time calculator for calculating the time at which the center position of the peak side rectangular pulse or the trough side rectangular pulse is output on the basis of the time count signal $C1_N$. In addition to the time count signal $C1_N$, a halved clock CLK2 which is obtained by dividing the frequency of the standard clock CLK2 into two halves by using a frequency divider 50 is input to the second counter 48.

The second counter 48 uses the cumulative count value $C1_N$ output from the first counter 46 as the initial value and cumulatively counts the halved clock CLK2 while adding it to the cumulative count value $C1_N$, as shown in FIG. 4. At the same time when the output $Y_2$ of the rectangular wave generation circuit 40 is switched from the peak side rectangular pulse 100B to the trough side rectangular pulse 100A, the second counter 48 stops counting, and outputs the count value $C2_N$ to a speed calculation unit 52.

Therefore, in the apparatus of this embodiment, when the (N−1)-th timing tooth 10A passes through the field of the sensor 12, the second counter 48 outputs the cumulative count value $C2_{N-1}$ (which indicates the time at which the center position of the peak side rectangular pulse $100B_{N-1}$ is output) which corresponds to the peak value outputting time $MB_{(N-1)}$ of the (N−1)-th AC signal $Y_1$, as shown in FIG. 4.

The apparatus of this embodiment repeats the same operations, and when the N-th timing tooth 10A passes through the field of the sensor 12, the count value $C2_N$ which corresponds to the peak value outputting time $MB_N$ of the N-th AC signal $Y_1$ is output from the second counter 48, as shown in FIG. 4.

Accordingly, the speed calculation unit 52 can obtain the outputting time interval $T_N$ for one period (in this embodiment, from $MB_{(N-1)}$ to $MB_N$) of the AC signal $Y_1$ by calculating the following formula on the basis of the cumulative count values $C2_N$ which are consecutively output in this way from the second calculator 48:

$$C2_N - C2_{N-1} = \frac{TB_N}{2} + TA_N + \frac{TB_{N-1}}{2} \quad (2)$$
$$= (TB_N + 2TA_N + TB_{N-1})/2$$
$$= T_N$$

It is clear from the comparison between the formulae (1C) and (2) that both formulae conduct completely the same calculation. The speed calculation unit 52 in this embodiment can therefore detect accurately the time interval $T_N$ from the point when the (N−1)-th timing tooth 10A has passed through the field of the sensor 12 to the point when the N-th timing tooth 10A passes by the same place on the basis of the formula (2) without being influenced by the swell component W of a low frequency and the noise component N of a high frequency contained in the AC signal $Y_1$.

Consequently, the speed calculation unit 52 can detect the speed V and the acceleration $\alpha$ with accuracy on the basis of the thus-obtained time interval $T_N$ at which the timing tooth 10A passe by the sensor 12.

As the speed calculation unit 52, a CPU is generally used.

As described above, the secondary characteristic feature of the present invention is that the load applied to the CPU in calculating the speed V and the acceleration $\alpha$ is greatly relieved, thereby enabling one CPU to execute the calculation of the speed and the acceleration and other processing operations.

For this purpose, the apparatus of this embodiment is provided with a wait command circuit 54 and a third counter 56.

The wait command circuit 54 is constituted as an I/O circuit with a built-in timer circuit. While the peak side rectangular pulse 100B is output, a read inhibition command is output to the speed calculation unit 52, and while the trough side rectangular pulse is output, the read inhibition command is withdrawn.

Therefore, only during the withdrawal of the inhibition command the speed calculation unit (CPU) 52 reads the output $C2_N$ of the second counter 48, writes it into a memory circuit 58 and calculates the speed V and the acceleration $\alpha$ by using the written data and the preceding written data.

At other times, namely, while the read inhibition command is output, the speed calculation unit 52 is capable of executing processing operations other than the calculation of the speed V and the acceleration $\alpha$, for example, in accordance with the other data or processing programs stored in the memory circuit 58. Thus, it is possible to enhance the applicability of the CPU used as the speed calculation unit 52.

In the present invention, the third counter 56 is used in order to further enhance the applicability of the CPU 52. The third counter 56 functions as a rectangular pulse counter, and is so constituted as to count the number N of the timing teeth 10A which pass through the field of the sensor 12.

In this embodiment, every time the peak side rectangular pulse is output from the rectangular wave generation circuit 40, the count value N is increased by one and the cumulative count value N is input to the speed calculation unit 52.

Therefore, when the CPU constituting the speed calculation unit 52 is busy in another processing, it is possible to accurately obtain the time interval at which the timing tooth 10A passes through the field of the sensor 12 as the average value of several time intervals on the basis of the following formula (3) by using the count value N output from the third counter 56 even if several count values output from the counter 48 are skipped.

Additionally, in order to execute such calculation, the speed calculation unit 52 is so constituted as to input the outputs $C2_N$ and N of the second and third counters 48 and 56, respectively, into the memory circuit 58 as a pair of data.

$$T_n = \frac{C2_N - C2_{N-n}}{N - (N - n)} \quad (3)$$

wherein $C2_{N-n}$ and $(N-n)$ represent the preceding read outputs of the second and third counters 48 and 56, respectively.

This structure greatly relieves the load of the CPU constituting the speed calculation unit 52 when the speed V and the acceleration $\alpha$ are calculated, so that the CPU can execute other arithmetic processing operations with a sufficient capacity left. Accordingly, it is possible to use one CPU both as the speed calculation unit 52 and as the ESC 32 and, hence, to simplify the structure of the apparatus as a whole and reduce the cost of the apparatus.

Furthermore, according to the present invention, since the main calculation of the average value shown in the formula (1C) is conducted by using the two counters, it is possible to conduct the calculation at much higher speed than in the prior art in which the calculation is processed by reason of a software program. Thus, it is possible to do high speed calculation required of the ESC with a sufficient capacity left.

In this embodiment, the one-shot pulse generation circuit 42, second and third counters 48 and 56 and wait command circuit 54 are respectively so constituted as to operate in correspondence with the peak side rectangular pulse output from the rectangular wave generation circuit 40 and do the calculation of the formulae 1C. The present invention, however, is not limited to this structure, and it is also possible to constitute each of these members so as to operate in accordance with the trough side rectangular pulse output from the rectangular wave generation circuit 40 and to obtain the speed V and the acceleration $\alpha$ on the basis of the average value obtained from the following formula (4):

$$T_N = [(TA_N + TB_N) + (TB_N + TA_{N+1})]/2 \quad (4)$$
$$= (TA_N + 2TB_N + TA_{N+1})/2$$

The average value $T_N$ obtained in this way is shown in FIG. 7.

Second Embodiment

Although the halved clock CLK2 is input to the counter 48 by using the ½ frequency divider 50, as shown in FIG. 2, the present invention is not restricted thereto, and it is possible to provide a shifter 60 for doubling the cumulative count value $C1_N$ between the first counter 46 and the second counter 48, as shown in FIG. 8.

Figure 9:
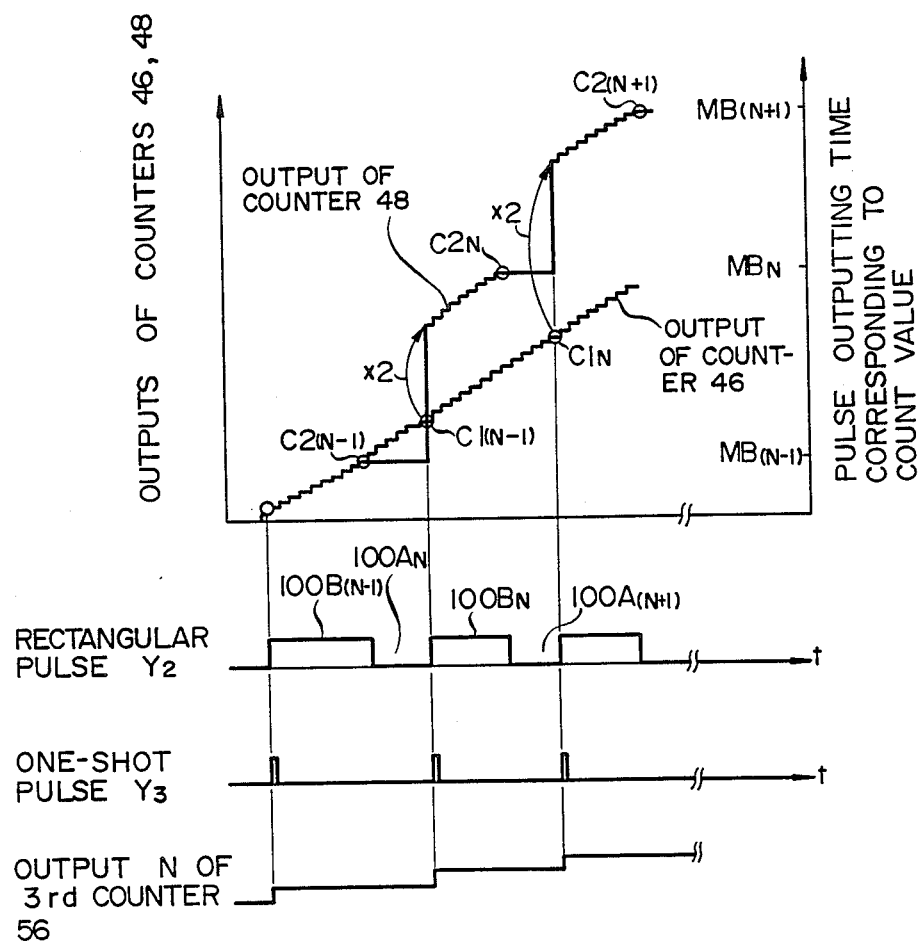

In this case, the standard clock CLK1 is directly input to the second counter 48 and the counting operation shown in FIG. 9 is conducted. This structure also enables good detection of the speed V and the acceleration $\alpha$ in the same way as in the first embodiment.

Third Embodiment

Figure 10:
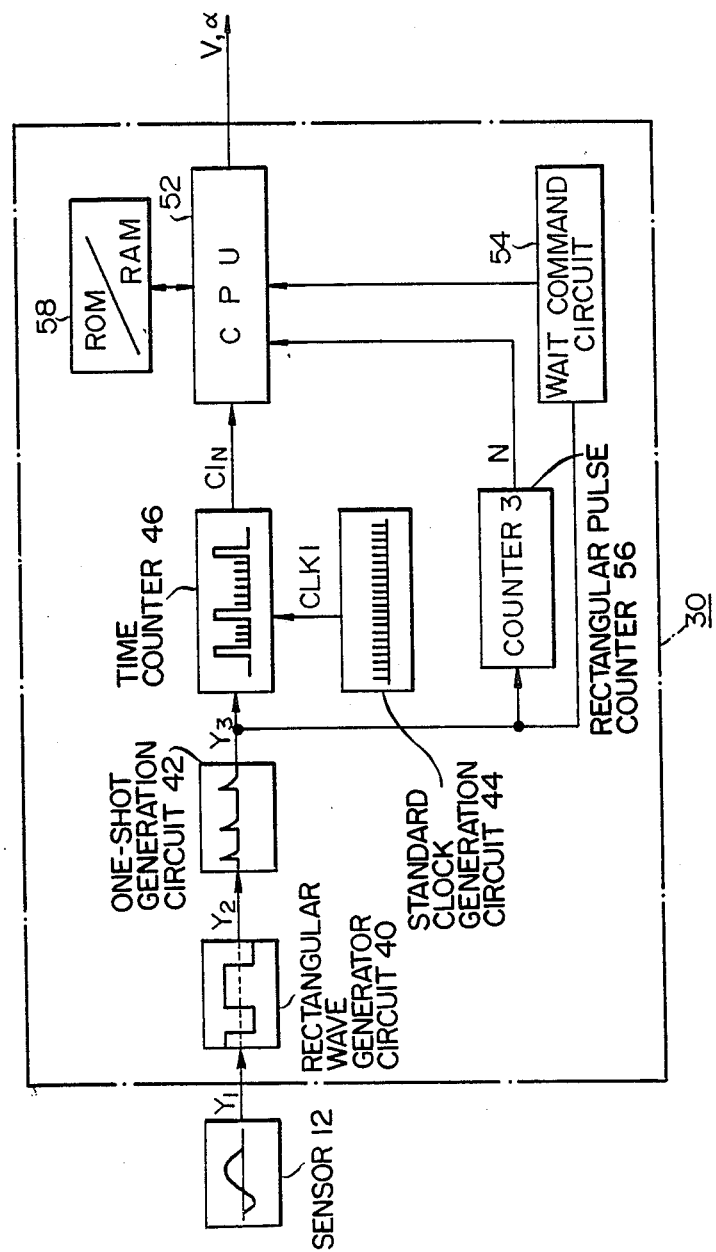
FIGS. 10 and 11 are explanatory views of a third embodiment of the present invention.
Figure 11:
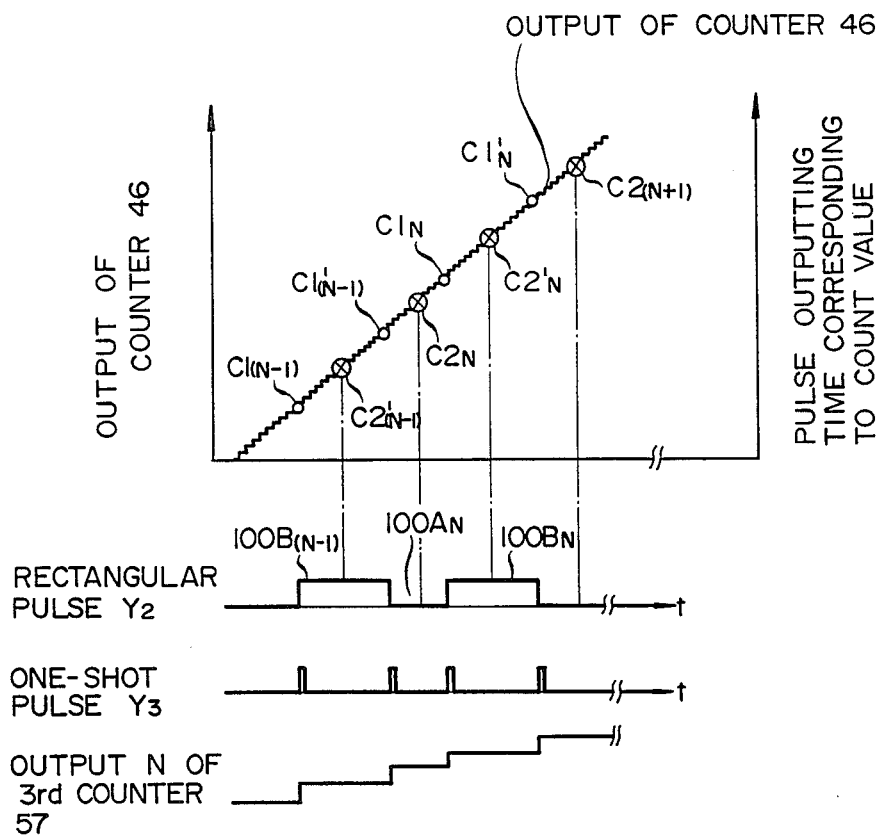

FIG. 10 shows a third embodiment of the present invention and FIG. 11 shows a preferred example of the counting operation thereof.

In this embodiment, the one-shot generation circuit 42 is so constituted as to output a one-shot pulse $Y_3$ to the first counter 46 at both rise and fall points.

The first counter 46 directly outputs the cumulative count value as the first count signal $C1_N$ to the speed calculation unit 52 every time the one-shot pulse $Y_3$ is output.

The speed calculation unit 52 in this embodiment reads consecutively at least two first count signals $C1_{N-1}$ and $C1_N$ which are output consecutively on the basis of a predetermined read signal, writes and stores them into the memory circuit 58.

The speed calculation unit 52 also functions as the second counter 48 in the first embodiment, and calculates the counter value $C2_N$ which indicates the peak value outputting time $MB_N$ or the trough value outputting time $MA_M$ of the AC signal $Y_1$ on the basis of the data written in the memory circuit 58 through a software. The calculated value $C2_N$ is written into the memory circuit 58 together with the count value N output from the third counter 56.

The speed calculation unit 52 can therefore calculate the speed V and the acceleration $\alpha$ in the same way as in the first embodiment by processing the calculated value $C2_N$ written in the above-described way in the same way as the count signal $C2_N$ output from the second counter 48 in the first embodiment.

In the apparatus of this embodiment, since the second counter 48 is omitted and the calculation of the second counter 48 is imposed on the CPU which constitutes the speed calculation unit 52, it is inevitable that the calculation speed of the speed V and the acceleration $\alpha$ is lowered by that degree and the load of the CPU itself is increased. It goes without saying, however, that since it is possible to calculate the speed V and the acceleration $\alpha$ with accuracy even if several outputs of the first and third counters 46 and 56 are skipped, the load of the CPU is greatly relieved.

Another Example of Rectangular Wave Generation Circuit

Figure 12:
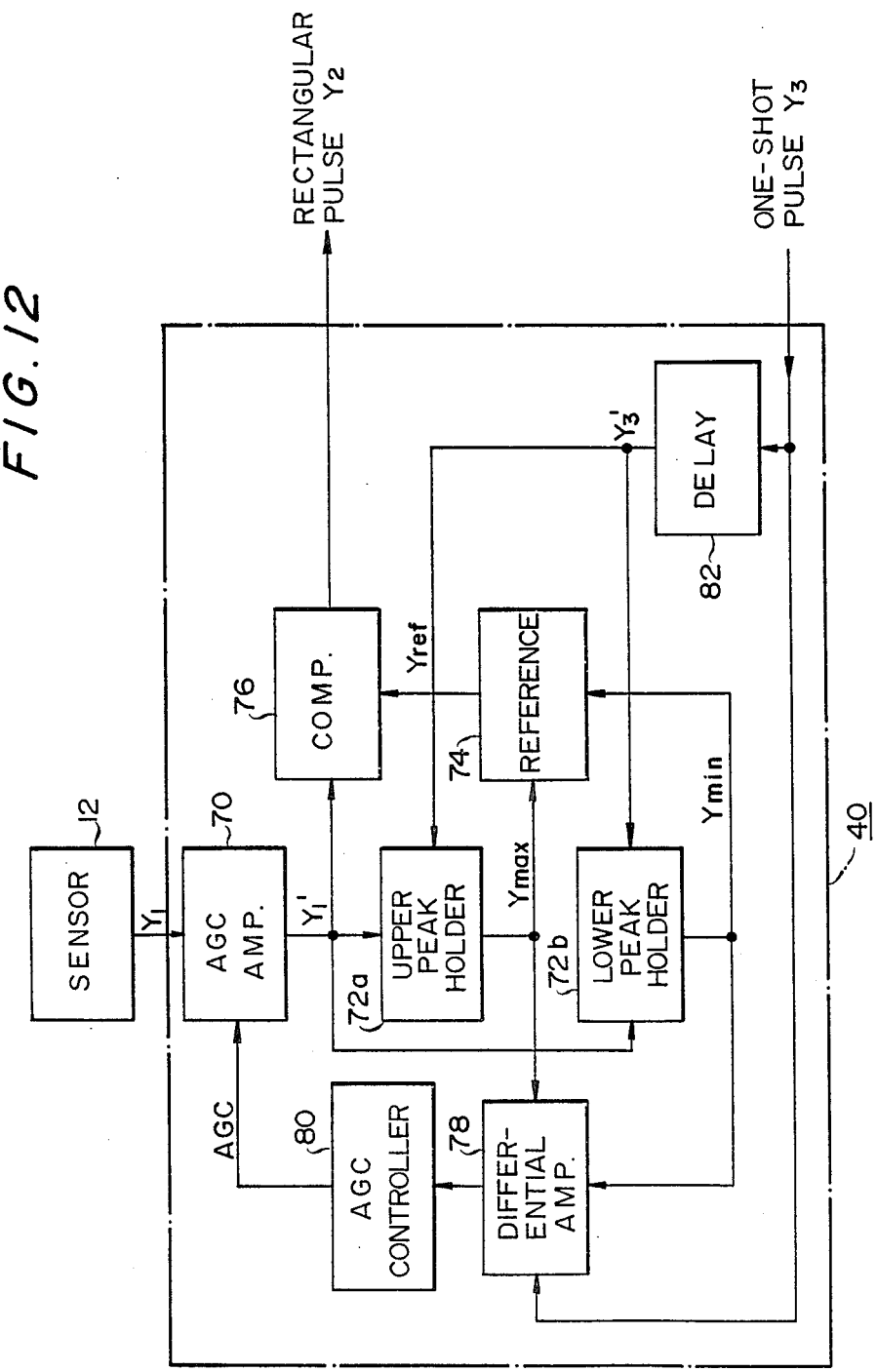
FIGS. 12 to 14 are explanatory views of another example of a rectangular wave generation circuit used in the apparatus of the present invention.
Figure 13:
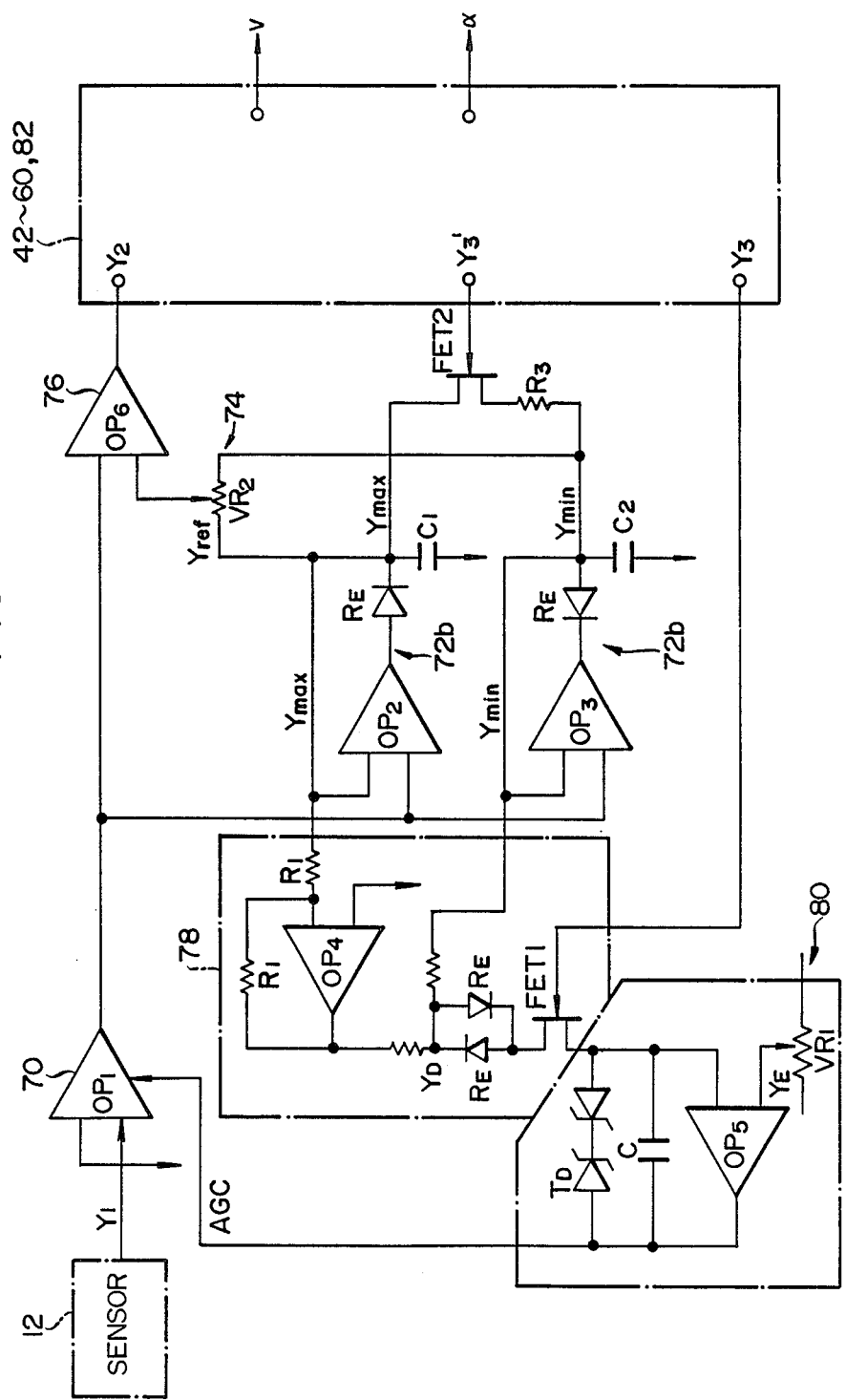

A second example of the rectangular wave generation circuit 40 shown in FIG. 2 is shown in FIG. 12. FIG. 13 shows the circuit structure thereof. The same numerals are provided for the elements corresponding to those of the first embodiment, and explanation thereof will be omitted.

This embodiment is characterized in that while the reference value Yref for converting the AC signal to a rectangular wave is fixed at the zero volt level in the first embodiment, the reference value Yref of the rectangular wave generation circuit 40 in this embodiment is caused to follow the swell component W and is set at an value between the peak value and the trough value at every period of the AC signal output $Y_1$.

Figure 14:
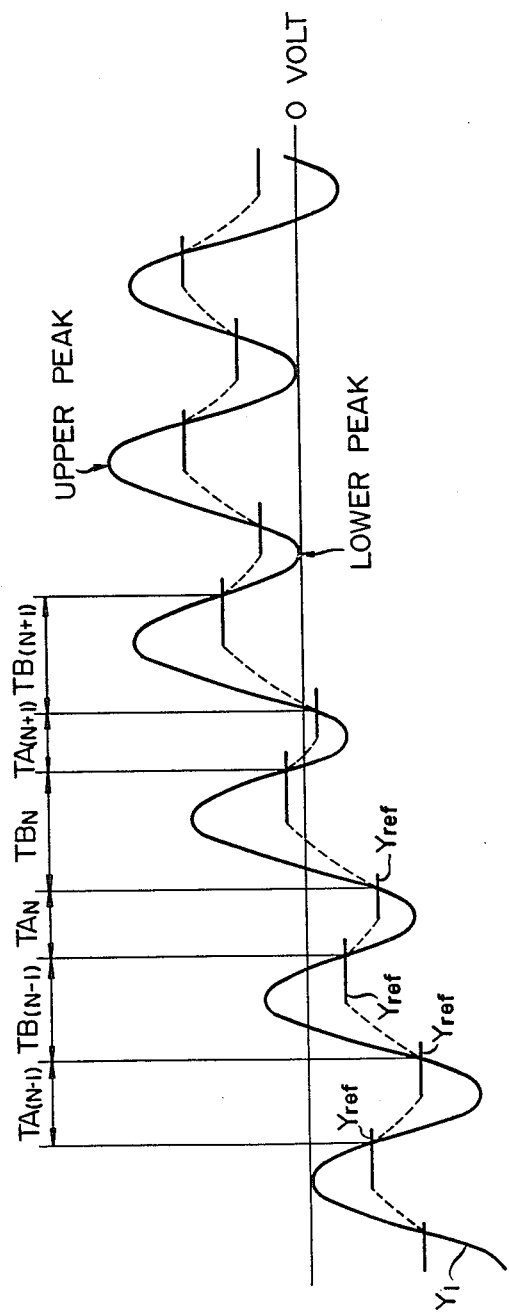

In this way, even if the situation takes place in which the AC output $Y_1$ of the sensor 12 rises and falls largely by the influence of the swell component W and does not cross the zero volt line, as shown in FIG. 14, a new reference voltage Yref is set between the peak value and the trough value, so that it is possible to constantly secure the output of the rectangular pulses 100A and 100B irrespective of the size of the swell component W, thereby enabling a further accurate measurement.

The circuit structure of the rectangular wave generation circuit 40 of this embodiment will be explained hereinunder.

When the AC signal $Y_1$ such as that shown in FIG. 14 is output from the sensor 12, the AC signal $Y_1$ is input to an amplifier 70 equipped with an AGC (automatic gain controller), and is amplified therein to an AC signal $Y_1$, of a predetermined width in accordance with a later-described AGC signal to be input to peak hold circuits 72a and 72b.

The peak hold circuit 72a for holding the peak value Ymax of the AC signal $Y_1$, is composed of an operational amplifier OP$_2$, a diode RE and a capacitor C$_1$, as shown in FIG. 13.

The other peak hold circuit 72b for holding the trough value Ymin of the AC signal Y$_1$, is composed of an operational amplifier OP$_3$, a diode RE and a capacitor C$_2$, as shown in FIG. 13.

A reference value setting circuit 74 averages the peak hold value Ymax and the lower hold value Ymin, and sets the average value obtained as the reference value Yref.

Such a reference value Yref is set by using a potential divider consisting of a variable resistor VR$_2$, as shown in FIG. 13, and can be set at an appropriate value for the particular occasion. In this example, the reference value Yref is set at an intermediate value between the peak hold value and the lower hold value.

However, signal Y$_3$, (explained hereinafter) generated every ½ cycle turns FET2 on and changes both hold values to the intermediate value thereof each time. Therefore, just before signal Y$_3$, is generated after each ½ cycle, one of the two hold values remains the intermediate value, whereas the other becomes the peak hold value Y$_{max}$ or the lower hold value Y$_{min}$ generated during each ½ cycle. Accordingly, the reference value Y$_{ref}$ is established as an intermediate value between the previous Y$_{ref}$ and the hold values Y$_{max}$, Y$_{min}$.

A comparator 76 compares the reference value Yref output in this way with the AC signal Y$_1$', and outputs the peak side rectangular pulse 100B at the point when Y$_1$, exceeds the reference value Yref, and the trough side rectangular pulse 100A at the point when Y$_1$, falls below the reference value Yref.

The rectangular wave generation circuit 40 in this embodiment feed backs the one-shot pulse Y$_3$ as a reset pulse to the peak hold circuits 72a and 72b at every half cycle of the AC signal Y$_1$ so that the optimum reference value Yref may be set in conformity with the swell component W.

In this way, the hold value of each of the peak hold circuits 72a and 72b is reset and changed to a new value at every one or half cycle of the AC signal Y$_1$.

Since the reference value setting circuit 74 can set the optimum reference voltage Yref on the basis of the peak hold value Ymax or the lower hold value Y min which is newly set at every cycle, the comparator 76 is capable of outputting the rectangular pulse 100A or 100B at the optimum timing without being influenced by the swell component W of a low frequency and the noise component N of a high frequency contained in the AC signal Y$_1$, as will be described in detail in the following (a) and (b).

(a) Reason why the swell component W is eliminated

Figure 22:
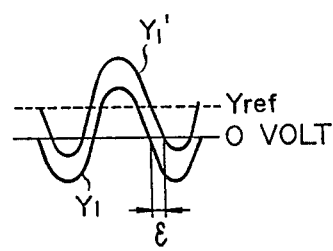
Figure 23:
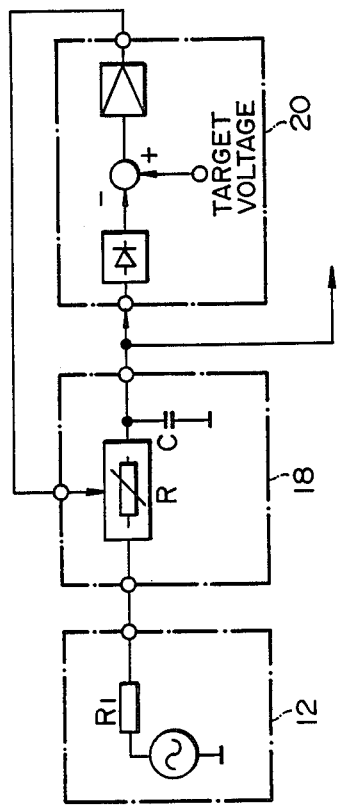
FIGS. 23 to 27 are explanatory views of conventional speed detecting apparatus.
Figure 24:
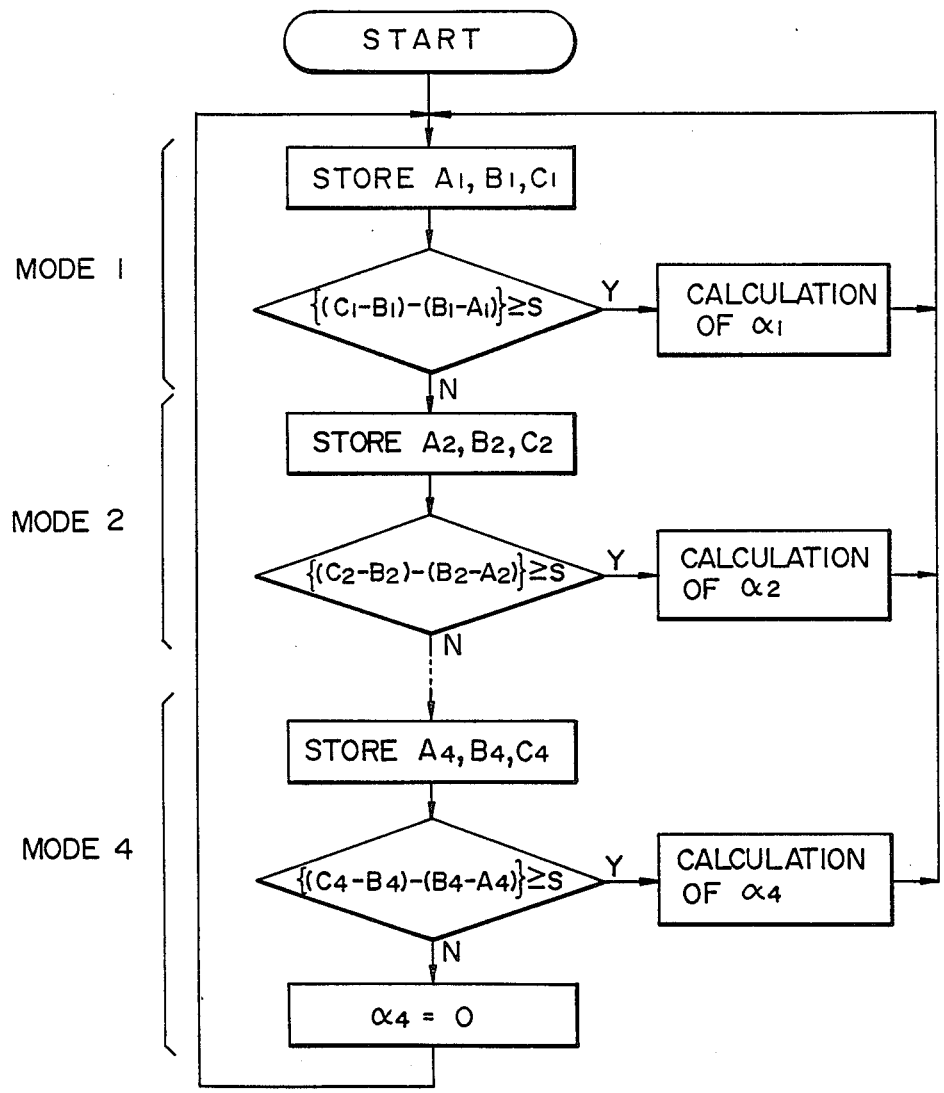
Figure 25:
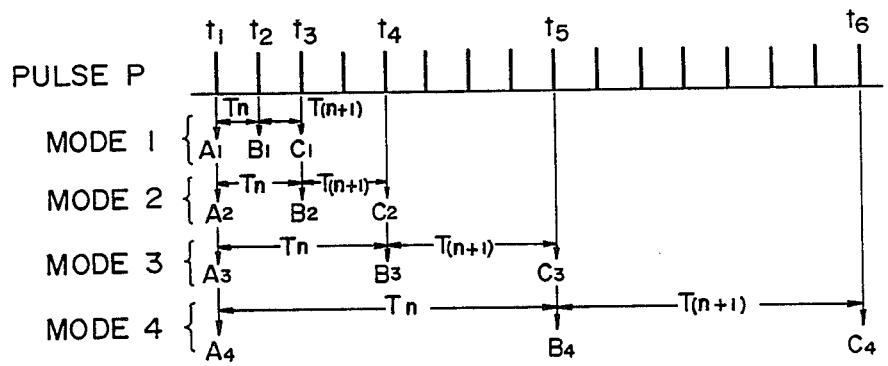
Figure 26:
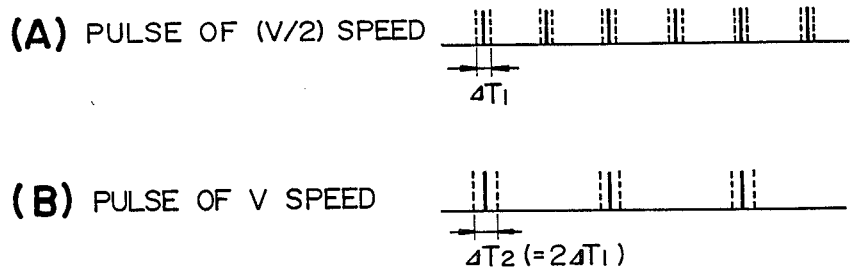
Figure 27:
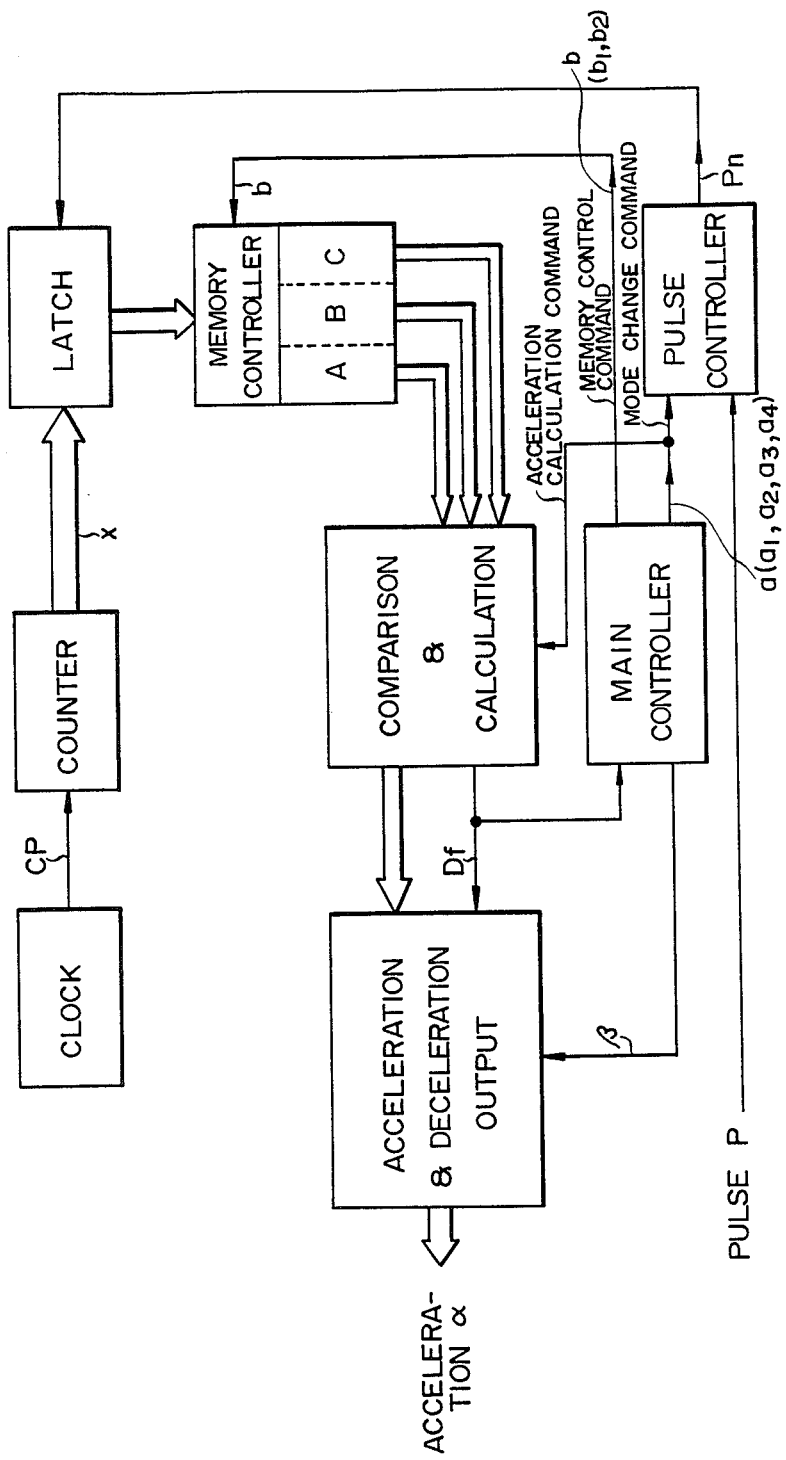

It is assumed that the AC signal which is originally to (b) Reason why the noise component N is eliminated be output from the magnetic sensor 12 at the position Y$_1$ is output at the position Y$_1$, by the influence of the swell component W, as shown in FIG. 22.

In this case, according to the zero-cross method in the first embodiment, the rectangular pulse Y$_2$ is output at the position deviated from the original position by $\epsilon$, and the error component $\epsilon$ increases with the increase of the swell component.

In contrast, in the apparatus of this embodiment, since it is possible to set the optimum reference voltage Yref, namely, what is called a second zero volt level Yref indicated by the broken line in FIG. 22 in such a manner as to follow the swell component W on the basis of the peak hold value Ymax and the lower hold value Ymin which are newly set at every period of the AC signal Y$_1$, it is possible to constantly output the rectangular pulse Y$_2$ at the optimum phase irrespective of the swell component W.

(b) Reason why the noise component N is eliminated

The influence of the noise component N contained in the AC signal Y$_1$ is determined by the size of the fundamental wave which rises and falls from the zero volt level, namely, the sine wave, and the larger the fundamental wave component relative to the noise component is, the smaller becomes the influence of the noise component.

Figure 21:
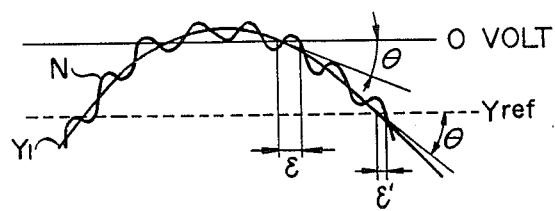

It is now assumed that the noise component overlaps the fundamental wave (sine wave), as shown in FIG. 21.

In this case, if the reference voltage Yref is set in the vicinity of the positive or negative peak value of the sine wave, the error caused by the noise component N becomes as large as $\epsilon$. It will be understood, however, that if the reference voltage Yref is set at a position where the inclination of the sine wave is large (positions at which the phases are 0, $\pi$, $2\pi$, ...), the error caused by the influence of the noise component N is greatly reduced to $\epsilon'$.

It is therefore understood that in the case of outputting the rectangular pulse Y$_2$ by the zero-cross method, if the amount of deviation between the position of the zero volt, which is the reference voltage, and the original zero-cross position of the sine wave is increased by the influence of the swell component W, the phase at which the rectangular pulse Y$_2$ is output largely deviates from the correct position.

In contrast, according to the apparatus of this embodiment, since the reference voltage Yref is set at the position at which the inclination of the sine wave component reaches its maximum at every period of the AC signal Y$_1$, it is possible to output the rectangular pulse Y$_2$ at the correct phase without being influenced by the noise component N and the swell component W which may be contained in the AC signal Y$_1$.

As explained in (a) and (b), according to this embodiment, the comparator 76 outputs the rectangular pulses 100A and 100B without being influenced by the swell component W of a low frequency and the noise component N of a high frequency contained in the AC signal Y$_1$ at the correct phase every time each timing tooth 10A passes through the field of the sensor 12.

It will therefore be understood that by subjecting a rectangular pulse obtained and processed in the above-described way to the arithmetic processing represented by the formula (1C) in accordance with the present invention it is possible to detect the speed V and the acceleration $\alpha$ while reducing the influence of the swell component W and the noise component N to a greater extent in comparison with the first embodiment which uses the zero-cross method.

In the rectangular wave generation circuit 40 in this embodiment, the one-shot pulse Y$_3$ is input to a differential amplifier 78 and the differential output is input to an AGC voltage setting circuit 80.

The differential amplifier 78 and AGC voltage setting circuit 80 output a predetermined AGC signal to the amplifier 70 equipped with the AGC in accordance with the output timing of the one-shot pulse Y$_3$ so that the amplitude of the AC signal Y$_1$ output from the sensor 12 may be constant.

More specifically, an operational amplifier $OP_4$ for inversion and amplification inverts the peak hold value Ymax, and an intermediate voltage YD between the inverted output Ymax and the lower peak hold value Ymin is fetched through an analog switch, as shown in FIG. 13.

The analog switch is composed of two diodes connected to each other reversely in parallel, whereby a predetermined width of a blind sector is set, thereby preventing the oscillation of the circuit itself so as to improve the high-speed followability thereof.

The intermediate voltage YD fetched in this way is compared with a comparison voltage YE which is set by a variable resistor VR1 and, on the basis of the differential voltage, is integrated by an integration circuit the amplitude of which is restricted by an operational amplifier $OP_5$, a capacitor C and a Zener diode TD for limiters.

As described above, the one-shot pulse $Y_3$ is input to an FET1 so as to control the integrated value and the integration period of the intermediate voltage YD, and the integrated value is output as the AGC signal to the amplifier 70 equipped with the AGC.

The signal $Y_3$, input to each of the peak hold circuits 72a and 72b is delayed in outputting by a delay circuit 82 by a predetermined short time with respect to the signal $Y_3$ which is input to the differential amplifier 78, thereby adjusting the timing for the AGC control and the reference voltage Yref setting operation.

The data actually obtained by using a speed detecting apparatus of the present invention will now be examined in comparison with those obtained by a conventional one.

Figure 15:
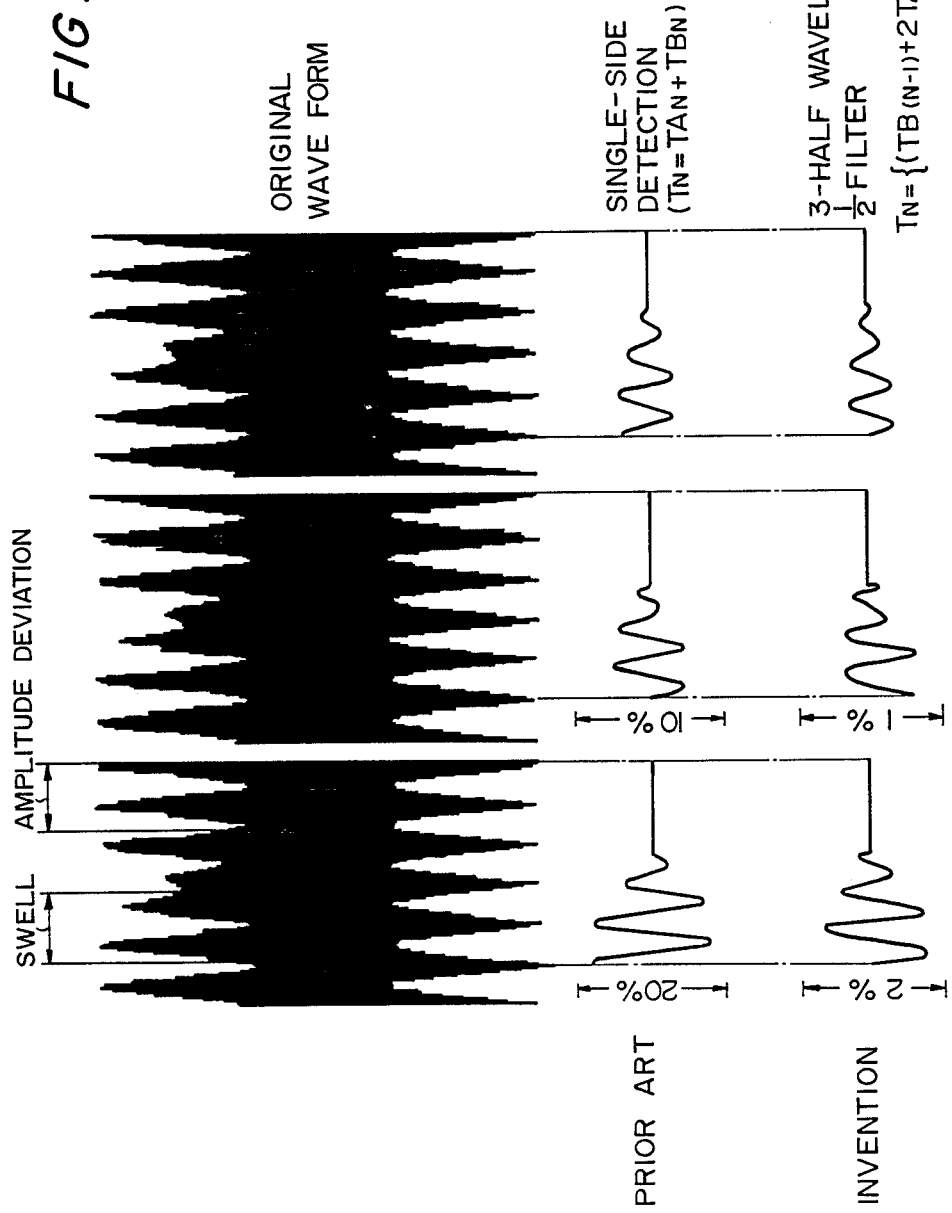

FIG. 15 shows the wave form of the AC signal $Y_1$ output from the sensor 12 when a timing gear with 100 protruding timing teeth 10A provided on the peripheral surface thereof was used as the rotor 10 and the gear 10 was mounted on an axle with 5 fitting bolts.

As is clear from FIG. 15, the AC signal $Y_1$ exhibits 5 changes in swell or amplitude mainly because the number of the fitting bolts was 5.

Among these 5 cycles, the first 1.75 cycles were considered to be a swell part, the last 1.75 cycles an amplitude change part and the intermediate 1.5 cycles a gradual change part. The AC signal $Y_1$ contained in the first 1.75 cycles is represented by the following formula:

$$Y_1 = -0.5 \cdot \cos(0.1\pi \cdot t) - \cos(2\pi \cdot t)$$

and the AC signal $Y_1$ contained in the last 1.75 cycles is represented by the following formula:

$$Y_1 = -(1 - 0.5 \cdot \cos(0.1\pi \cdot t)) \cdot \cos(2\pi \cdot t)$$

Under such conditions the AC signal $Y_1$ was converted into a rectangular wave by using the apparatus (zero-cross method) shown in FIG. 2, and the time $T_N$ equivalent to one period of the AC signal $Y_1$ was experimentally obtained from the following two formulae:

$$T_N = TA_N + TB_N \text{ (prior art) and} \quad (1)$$

$$T_N = (TB_{N-1} + 2 \cdot TA_N + TB_N)/2 \text{ (formula (1C) in} \quad (2)$$

accordance with the present invention)

The errors contained in the vehicle speeds and the accelerations calculated on the basis of the respective $T_N$ values obtained in this way were experimentally obtained and compared with each other.

These experimental data are shown in FIG. 15 as the errors from the normal, the relative errors between the adjacent wavelengths and the average error of 8 wavelengths in that order from left to right.

The "error from the normal" means the deviation of the timing gear from the normal position within one period.

The "relative error" indicates the relative error between the adjacent teeth.

The "average error of 8 wavelengths" represents the average value of errors of 8 pitches, or the value obtained by dividing by 8 the deviation amount of the timing gear for 8 pitches from the normal position.

FIG. 16 shows the thus-obtained comparative data which are converted into numeral data.

As is clear from the results of the experiments, according to the apparatus of the present invention, it is possible to reduce the error due to the swell component W to at least about 1/10 in comparison with the prior-art method of obtaining the speed V and the acceleration $\alpha$ simply from the pulse time of the rectangular wave. In addition, the apparatus can manifest an excellent effect of reducing the error caused by the noise component N substantially to a negligibly small value.

Figure 17:
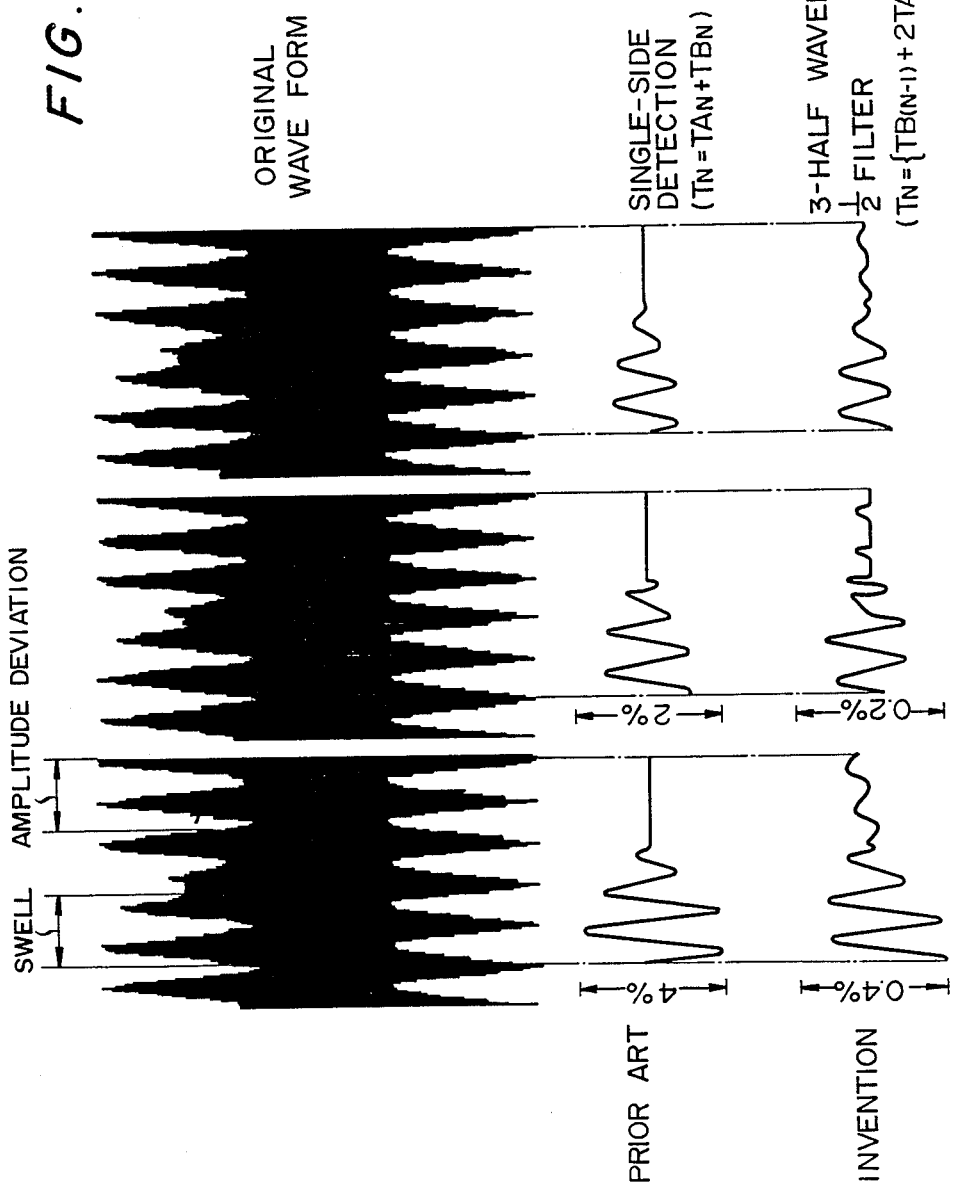

FIG. 17 shows the data obtained from the similar experiments using the rectangular pulse generation circuit shown in FIG. 12. The comparative data obtained and converted into numeral data are shown in FIG. 16.

It is clear from FIG. 16 that it is possible to reduce the error due to the swell component to a further greater extent and to detect the speed V and the acceleration $\alpha$ with high accuracy, as is also obvious from the results of the experiment, by setting the reference value Yref at every half cycle on the basis of the peak value and the trough value of the AC signal $Y_1$.

Although a Schmitt trigger circuit or a circuit for generating pulse wave by holding each peak value, as shown in FIG. 12, is used as the rectangular wave generation circuit 40 in the embodiments, the present invention is not restricted thereto and may adopt any rectangular pulse generation circuit so long as it ca judge whether the AC signal $Y_1 >$ Yref or $Y <$ Yref by comparing the AC signal $Y_1$ with a predetermined reference value Yref. The rectangular wave generation circuit 40 may therefore be so designed, for example, as to output a signal indicating only the rise point and the fall point of a rectangular wave pulse, not a rectangular wave pulse itself.

If the circuitry of the rectangular wave generation circuit 40 is composed at a TTL level, it is sufficient that the rectangular wave generation circuit 40 is so composed as to output a signal of an L level or H level as the rectangular wave pulse $Y_2$. In any case, if the circuit can judge whether the AC signal $Y_1 >$ the reference value Yref or $Y <$ Yref, it is sufficient as the rectangular wave generation circuit 40.

As described above, according to the present invention, even when a swell component of a low frequency and a noise component of a high frequency is mixed into an AC signal output from a sensor, it is possible to detect the speed V and the acceleration $\alpha$ at accuracy without being influenced by these components. Thus, the speed detecting apparatus of the present invention is very suitable as a speed detecting apparatus for various automotive mechanisms such as an ESC system which are required to have a high detection accuracy.

According to the present invention, since the apparatus is unlikely to be influenced by the swell component contained in an AC signal, even if a cheap timing gear produced by pressing or the like is used as a rotor which is opposed to the sensor, it is possible to detect the speed and the acceleration at a real time with high accuracy. Thus, it is possible to provide a cheap and high-accuracy speed detecting apparatus.

Especially, according to the present invention, since a counter is chiefly used for processing the average value of the periods in which rectangular pulses are output from the rectangular wave generation circuit, it is possible to calculate the speed V and the acceleration α at high speed. Thus, the apparatus of the present invention is very suitable as a speed detecting apparatus incorporated into an apparatus such as an ESC system which is required to carry out high-speed calculation.

Furthermore, according to the present invention, since mainly a counter takes charge of processing of the average value of the rectangular pulses, the load of the speed calculation unit is greatly relieved. When the speed calculation unit is composed of a CPU, it is possible to allot the capacity of the CPU remaining due to the relief of the load to other processing operations or control. If such a speed detecting apparatus is incorporated into a system, it is possible to greatly reduce the cost of the system as a whole.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A speed detecting apparatus for vehicles having a rotor provided with a multiplicity of protrusions on the peripheral surface thereof and a sensor which is attached to a stationary side of a vehicle in such a manner as to face said rotor and wherein said sensor outputs an AC signal when each of said protrusions of said rotor passes in front of said sensor to calculate at least one of the speed and acceleration of vehicles on the basis of said AC signal, said speed detecting apparatus comprising:

rectangular wave generation circuit means for converting an AC signal into a number of rectangular pulses and outputting the generated rectangular pulse signals;

rectangular pulse counter means for counting the rectangular pulse signals and outputting the counted value as a pulse number count signal which indicates the number of the rectangular pulses;

time counter means for cumulatively counting clock pulses and outputting the cumulative count value as a time count signal which indicates the time at the rise point or the fall point of a rectangular pulse every time said rectangular pulse rises or falls;

time calculator means for calculating the time for outputting the center position of a peak side rectangular pulse or a trough side rectangular pulse on the basis of said time count signal and outputting the calculated value as a center position time signal;

memory circuit means for storing said pulse number count signal and said center position time signal corresponding to said pulse number count signal on the basis of a read signal; and speed calculation means for calculating a first difference between preceding written data and present data of the pulse number count signal, calculating a second difference between preceding written data and present data of the center position time signal, and calculating said at least one of the speed and acceleration on the basis of said first and second differences, thereby detecting the speed and the acceleration without being influenced by a low frequency swell component and a high frequency noise component contained in said AC signal.

2. A speed detecting apparatus for vehicles according to claim 1, wherein said time calculator means writes time count values obtained from said time count signals at the rise point and fall point of a rectangular pulse into said memory circuit means, averages both time count values, adds the obtained averaged value to the earlier time count value and outputs the resultant added value as a center position time signal of the rectangular pulse.

3. A speed detecting apparatus for vehicles according to claim 1, wherein said time calculator means comprises a counter which reads a time count signal output from a time counter as the initial value and cumulatively counts a halved pulse of the clock pulses which said time counter means counts while either peak side rectangular pulse or trough side rectangular pulse is output, thereby calculating the time at which the center position of said rectangular pulse is output.

4. A speed detecting apparatus for vehicles according to claim 3, wherein
   said speed calculation means comprises a CPU which outputs a data read signal; and
   said CPU writes and stores the data output from said time calculator means, and the data output from said rectangular pulse counter means into said memory circuit means, and calculates said at least one of the speed and the acceleration on the basis of said present data and the preceding written data.

5. A speed detecting apparatus for vehicles according claim 1, wherein
   said rectangular wave generation circuit means comprises:
   a peak hold circuit for holding both peak values and trough values of said AC signal;
   a reference value setting circuit for setting a reference signal on the basis of the average value of both peak hold values;
   comparator means for comparing said AC signal with the reference signal and outputting a peak side rectangular pulse or trough side rectangular pulse; and means for resetting said peak hold circuit every time a new rectangular pulse is outputted so as to output a rectangular pulse without the influence of a swell component of a low frequency and a noise component of a high frequency contained in said AC signal.

6. A speed detecting apparatus for vehicles according to claim 1, wherein said time calculator means is comprised of:
   a shifter which doubles the time count signal output from said time counter means; and
   a second counter which reads the doubled time count signal as an initial value and cumultively counts the clock pulses which said time counter means counts while outputting either the peak side rectangular pulse or trough side rectangular pulse, thereby calculating the time at which the center position of said rectangular pulse is output.

* * * * *